(12) United States Patent
Orun

(10) Patent No.: US 11,741,119 B2
(45) Date of Patent: Aug. 29, 2023

(54) CANONICAL DATA MODEL FOR DISTRIBUTED DATA CATALOG AND METADATA EXCHANGE

(71) Applicant: salesforce.com, inc., San Francisco, CA (US)

(72) Inventor: Mehmet Orun, San Francisco, CA (US)

(73) Assignee: SALESFORCE, INC., San Francisco, CA (US)

( * ) Notice: Subject to any disclaimer, the term of this patent is extended or adjusted under 35 U.S.C. 154(b) by 184 days.

(21) Appl. No.: 17/158,479

(22) Filed: Jan. 26, 2021

(65) Prior Publication Data

US 2022/0237202 A1   Jul. 28, 2022

(51) Int. Cl.
  *G06F 16/245* (2019.01)
  *G06F 16/25* (2019.01)
  *G06F 16/21* (2019.01)

(52) U.S. Cl.
  CPC .......... *G06F 16/254* (2019.01); *G06F 16/212* (2019.01); *G06F 16/245* (2019.01)

(58) Field of Classification Search
  CPC ..... G06F 16/254; G06F 16/245; G06F 16/212
  See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |

(Continued)

OTHER PUBLICATIONS

Akintoye et al., "Data Model for Cloud Computing Environment", International Conference on e-Infrastructure and e-Services for Developing Countries, Springer, Cham., pp. 199-215 (Oct. 2018), available at: https://www.researchgate.net/profile/Antoine_Bagula2/publication/328253223_Data_Model_for_Cloud_Computing_Environment/links/5bc0f130299bf1004c5b0cdb/Data-Model-for-Cloud-Computing-Environment.pdf.

(Continued)

*Primary Examiner* — Alicia M Willoughby
(74) *Attorney, Agent, or Firm* — Schwabe Williamson & Wyatt

(57) ABSTRACT

Systems, methods, and computer-readable media are provided for data catalogs, metadata repositories, data discovery, and data governance, and in particular, for a canonical model-driven active metadata exchange for distributed data catalogues. Disclosed implementations include an application independent metadata repository with a Canonical Data Model (CDM). The CDM maintains a single set of use case agnostic mappings between data sources and the CDM. The physical mappings of a particular entity in the CDM are used to determine the different applications that are mapped to it and what objects or data structures that are exposed by that particular data source. Other embodiments may be described and/or claimed.

25 Claims, 5 Drawing Sheets

(56) References Cited

U.S. PATENT DOCUMENTS

| | | | |
|---|---|---|---|
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,133 B1 | 4/2001 | Masthoff | |
| 6,216,135 B1 | 4/2001 | Brodersen et al. | |
| 6,233,617 B1 | 5/2001 | Rothwein et al. | |
| 6,236,978 B1 | 5/2001 | Tuzhilin | |
| 6,266,669 B1 | 7/2001 | Brodersen et al. | |
| 6,288,717 B1 | 9/2001 | Dunkle | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,411,949 B1 | 6/2002 | Schaffer | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec et al. | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 6,907,566 B1 | 6/2005 | McElfresh et al. | |
| 7,062,502 B1 | 6/2006 | Kesler | |
| 7,069,231 B1 | 6/2006 | Cinarkaya | |
| 7,069,497 B1 | 6/2006 | Desai | |
| 7,100,111 B2 | 8/2006 | McElfresh et al. | |
| 7,181,758 B1 | 2/2007 | Chan | |
| 7,269,590 B2 | 9/2007 | Hull et al. | |
| 7,289,976 B2 | 10/2007 | Kihneman et al. | |
| 7,340,411 B2 | 3/2008 | Cook | |
| 7,356,482 B2 | 4/2008 | Frankland et al. | |
| 7,373,599 B2 | 5/2008 | McElfresh et al. | |
| 7,401,094 B1 | 7/2008 | Kesler | |
| 7,406,501 B2 | 7/2008 | Szeto et al. | |
| 7,412,455 B2 | 8/2008 | Dillon | |
| 7,454,509 B2 | 11/2008 | Boulter et al. | |
| 7,461,039 B1 * | 12/2008 | Gilman | G06F 16/254 706/25 |
| 7,508,789 B2 | 3/2009 | Chan | |
| 7,599,935 B2 | 10/2009 | La Rotonda et al. | |
| 7,603,331 B2 | 10/2009 | Tuzhilin et al. | |
| 7,603,483 B2 | 10/2009 | Psounis et al. | |
| 7,620,655 B2 | 11/2009 | Larsson et al. | |
| 7,644,122 B2 | 1/2010 | Weyer et al. | |
| 7,668,861 B2 | 2/2010 | Steven | |
| 7,698,160 B2 | 4/2010 | Beaven et al. | |
| 7,730,478 B2 | 6/2010 | Weissman | |
| 7,747,648 B1 | 6/2010 | Kraft et al. | |
| 7,779,039 B2 | 8/2010 | Weissman et al. | |
| 7,779,475 B2 | 8/2010 | Jakobson et al. | |
| 7,827,208 B2 | 11/2010 | Bosworth et al. | |
| 7,853,881 B1 | 12/2010 | Aly Assal et al. | |
| 7,945,653 B2 | 5/2011 | Zukerberg et al. | |
| 8,005,896 B2 | 8/2011 | Cheah | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,073,850 B1 | 12/2011 | Hubbard et al. | |
| 8,082,301 B2 | 12/2011 | Ahlgren et al. | |
| 8,095,413 B1 | 1/2012 | Beaven | |
| 8,095,531 B2 | 1/2012 | Weissman et al. | |
| 8,095,594 B2 | 1/2012 | Beaven et al. | |
| 8,103,611 B2 | 1/2012 | Tuzhilin et al. | |
| 8,150,913 B2 | 4/2012 | Cheah | |
| 8,209,308 B2 | 6/2012 | Rueben et al. | |
| 8,209,333 B2 | 6/2012 | Hubbard et al. | |
| 8,275,836 B2 | 9/2012 | Beaven et al. | |
| 8,457,545 B2 | 6/2013 | Chan | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,045 B2 | 8/2013 | Rueben et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 9,594,790 B2 | 3/2017 | Fuchs et al. | |
| 9,626,158 B1 * | 4/2017 | Ben-Tzur | G06F 3/0482 |
| 9,659,303 B2 | 5/2017 | Orun et al. | |
| 10,671,626 B2 | 6/2020 | Dray et al. | |
| 10,733,212 B2 | 8/2020 | Orun et al. | |
| 2001/0044791 A1 | 11/2001 | Richter et al. | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0199543 A1 | 10/2004 | Braud et al. | |
| 2004/0249854 A1 | 12/2004 | Barnes-Leon et al. | |

(56) References Cited

U.S. PATENT DOCUMENTS

| | | |
|---|---|---|
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0055167 A1* | 3/2011 | Howey .............. G06F 16/24556 707/687 |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2013/0325789 A1* | 12/2013 | Krishnan .............. G06F 16/254 707/602 |
| 2014/0359537 A1 | 12/2014 | Jackobson et al. |
| 2017/0006135 A1* | 1/2017 | Siebel ....................... G06F 8/10 |
| 2017/0169023 A1* | 6/2017 | Glover ................ G06F 16/9535 |
| 2019/0114342 A1 | 4/2019 | Orun et al. |
| 2020/0097471 A1 | 3/2020 | Tran et al. |
| 2020/0097476 A1* | 3/2020 | Tran ....................... G06Q 30/01 |
| 2020/0097482 A1* | 3/2020 | Woodward ............ G06F 3/0484 |
| 2022/0086160 A1* | 3/2022 | Samuel ................... G06F 9/451 |
| 2022/0237202 A1* | 7/2022 | Orun ..................... G06F 16/245 |

OTHER PUBLICATIONS

Cloud Information Model specification version 0.1, available at: https://cloudinformationmodel.org.

Establish, "D4.1 Data Management Platform Architecture", VTT Technical Research Centre of Finland Ltd., itea4.org (Oct. 27, 2017), available at: https://itea3.org/project/workpackage/document/download/4160/D4.1.%20ESTABLISH%20-%20Architecture%20of%20Data%20Management%20Platform.pdf.

Gorelik, "Cloud Computing Models." MIT doctoral dissertation, MIT Eng. Syst. Div. (Jan. 2013).

Talend, "What is a Data Catalog, and Do You Need One?", talend.com (2021).

\* cited by examiner

CANONICAL DATA MODEL FOR DISTRIBUTED DATA CATALOG AND METADATA EXCHANGE

TECHNICAL FIELD

One or more implementations relate to the field of database management systems, metadata repositories, data catalogs, data discovery, and data governance, and in particular, to a canonical model-driven active metadata exchange for distributed data catalogues.

BACKGROUND

In search of connected experiences and digital transformation, many enterprises adopt multiple systems. Larger enterprises tend to use more systems, and each system may come with a unique data model. When multiple unique data models are used, users often have difficulty discovering and/or unifying data across departments and systems. Furthermore, enterprise data is rarely standardized across databases and applications. In many cases, data is heavily customized for specific business requirements or is stored in its raw form. Enterprise data can also be classified as structured (e.g., with a formal data model) or unstructured (e.g., without a formal data model). Moreover, many enterprises store their data in a variety of databases including relational databases that use Structured Query Language (SQL), non-relational datastores (also referred to as NoSQL databases), and the like. Enterprises often solve this issue by asking developers or consultants to create custom code and solutions to connect the disparate applications and systems. Instead of accelerating digital transformation, this process slows innovation and leads to brittle integrations.

BRIEF DESCRIPTION OF THE DRAWINGS

The following figures use like reference numbers to refer to like elements. Although the following figures depict various example implementations, alternative implementations are within the spirit and scope of the appended claims. In the drawings:

DETAILED DESCRIPTION

1. Canonical Data Model Embodiments

1.1. Data Architecture

Figure 1A:
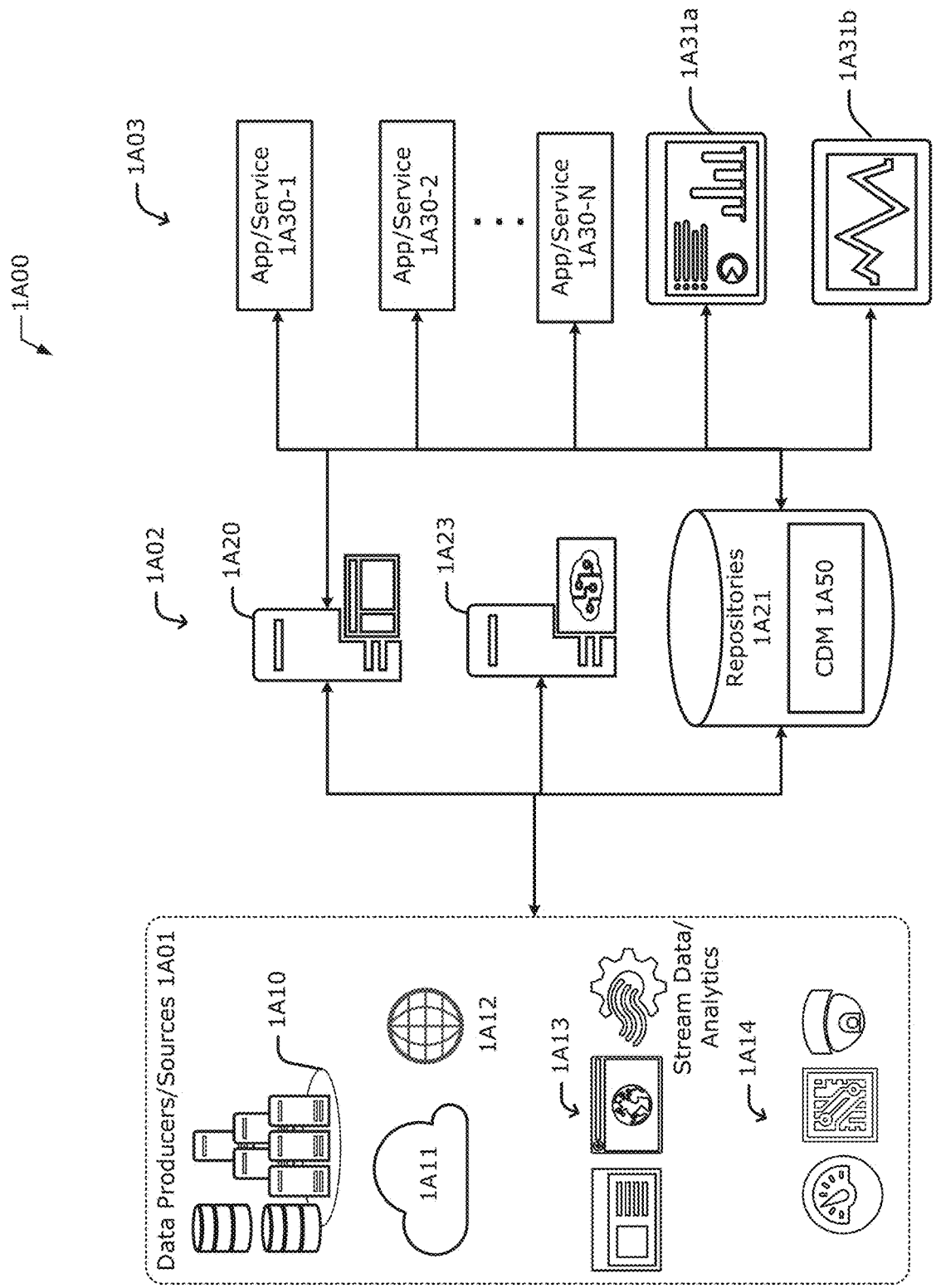
FIG. 1A illustrates an example data architecture in which example implementations may be practiced.

FIG. 1A shows an example of data architecture 1A00 in which various implementations can be practiced. The architecture 1A00 includes various data producers/sources 1A01, data catalog 1A02, and data consumers 1A03.

The data producers/sources 1A01 provide source data to the data catalog repositories 1A02. The data producers/sources 1A01 include data sources/producers that are internal to an enterprise as well as externally sourced data. In this example, the data producers/sources 1A01 include enterprise data center 1A10, cloud service providers 1A11, the Internet 1A12, other internal and/or external applications 1A13, and sensors/IoT devices 1A14. Other data sources/producers may provide source data in other embodiments. The source data may be relationally structured, semi-structured, multi-structured, and/or unstructured data. As examples, the structured data may be obtained from as relational databases and document filing systems, and the unstructured data may be obtained (or mined) from social media content, documents, images, email, text messages, and the like.

The data catalog 1A02 identifies, maps, and groups data assets from different sources 1A01 into topics making metadata of various applications (apps) and services 1A30-1 to 1A30-N (where N is a number) available in a central place, which may then be provided to data professionals and/or developers via dashboards 1A31a and/or data visualizations 1A31b, and/or to individual apps/services 1A30.

The apps/services 1A30 include any collection of program code, logic, instructions, scripts, etc., in the form of a deployable package or functional unit to achieve a certain function in an operational environment. The apps/services 1A30 may include software elements executed or operated by one or more app server(s) 1A20, the analytics environment 1A23, or cloud compute nodes of a cloud computing service, or the like; client-side and/or web applications used to access the server-side software elements; client-side apps operating independently of server-side elements, and/or combinations thereof. Examples of the apps/services 1A30 include data management/manager apps/services 1A30, marketing apps/services 1A30 (e.g., an order object in Salesforce® Commerce Cloud® to Salesforce® data manager), analytics apps/services 1A30 (e.g., Tableau®, MicroStrategy, etc.), data integration apps/services 1A30 (e.g., MuleSoft®, Informatica PowerCenter, etc.), and CDP apps/services 1A30 (e.g., Salesforce® Audience Studio®, Segment, etc.).

The data catalog 1A02 comprises applications and database objects or other data structures that maintains an inventory of data assets through the discovery, description, and organization of datasets. For purposes of the present disclosure, the term "data catalog" may refer to the applications operated by one or more app servers 1A20 that maps, groups, or otherwise maintains the data assets and/or one or more data repositories 1A21 used to store the data assets.

The data catalog 1A02 provides context to enable data consumers 1A03 to find and understand relevant datasets for the purpose of extracting value. The data consumers may include apps/services 1A30, data analysts, data scientists, data stewards, developers, and/or other data consumers (represented by dashboard 1A31a and performance monitor 1A31b in FIG. 1A). In other words, data catalogs 1A02 are, or include, metadata repositories 1A21 that provide listings of data elements/objects that are of interest to an enterprise (e.g., analytics, customer data platform (CDP), compliance operations, etc.), the apps/services 1A30 and/or databases that use the data elements/objects, and where data is stored/located across the enterprise's system (e.g., data warehouses, data archive locations, etc.). In some implementations, the repositories 1A21 include data warehouses, data lakes, and/or other data storage systems.

In some implementations, the data catalog 1A02 is, or includes, a master data management (MDM) system. MDM seeks to ensure that an enterprise or organization does not use multiple, potentially inconsistent, versions of the same data in different parts of its operations. MDM includes processes to ensure that reference data is kept up-to-date and coordinated across the enterprise. Many MDM systems attempt to create a "golden record," which is a single well-defined version of all the data entities (records) in the enterprise's databases. The golden record encompasses all the data in every system of record (SoR) within a particular organization. Many MDM systems also attempt to provide a set of "linkages," which involves identifying records across the enterprise's DBs that are related to the same entity (e.g., individual customers of the enterprise), and identifying individual elements (e.g., client devices or platforms) that tend to update records pertaining to the same entity. In some implementations, the MDM system may be the same or similar to the MDM system described in U.S. application Ser. No. 16/582,662, titled "MASTER DATA MANAGEMENT TECHNOLOGIES", filed on 25 Sep. 2019, which is hereby incorporated by reference in its entirety.

The data catalog 1A02 provides a repository for data assets and/or data asset metadata that alerts data consumers 1A03 about available data assets and how those data assets can be used. The data catalog 1A02 performs various cataloging functions such as data ingestion, refinement, analysis, and providing access to the data assets. Data ingestion involves bringing data into an analytics ecosystem 1A23 from the data sources 1A01. Ingestion may include batch and/or real time methods including ETL, ELT, data stream processing, and the like. Real-time data ingestion allows data analysts to develop applications that integrate batch data with continuously streaming data in real time.

Data refinement involves organizing data into shareable data stores such as data lakes, data warehouses, and master data/reference data hubs (e.g., repositories 1A21 in FIG. 1A). Data cleansing, integration, aggregation, and other types of data transformations may also be performed, for example, by a data refinery or other like system(s). In some implementations, data pipeline orchestration tools may be used to manage the simultaneous ingestion, processing, and analysis applied to both static and streaming data.

The analytics ecosystem 1A23 (also referred to as an "analytics environment," "analytical environment," "analytics platform," "sandbox," or the like), functions to solve the business problem of big data. The analytics ecosystem 1A23 is an environment that contains various apps/tools and/or services to create, build, and collaborate around various data. The analytics environment 1A23 may be hosted by one or more analytics environment servers, and may provide custom dashboards 1A31a and data visualization tools 1A31b that allow data consumers to manipulate data with predictive models for different micro and macro-level scenarios.

The analytics environment 1A23 may support descriptive analytics, which encompasses operational reporting, diagnostic analyses, and correlation analyses. Additionally or alternatively, the analytics environment 1A23 may support various other analytics utilities and capabilities, including: predictive analytics (e.g., using data mining, machine learning and artificial intelligence techniques to develop models for predicting future behaviors); prescriptive analytics (e.g., providing recommendations for optimal outcomes of selected options based on predictive analytics, such as automating decision processes); integrated analytics (e.g., allowing developed analytical models to be integrated within information flows to execute automated decision support and execution); and/or feature extraction and text analytics (e.g., automatically identifying and extracting features from semi-structured and/or unstructured data that can then be used to fuel predictive and prescriptive analyses). The various analytics utilities and capabilities may involve using various ML/AI algorithms and models Data analysis involves turning the data into information and insights. The data analysis may include the app server(s) 1A20 and/or analytics environment 1A23 generating data science/analytics reports and/or visualizations. These reports and/or visualizations may include or indicate the data that is available to the enterprise, the data sources 1A01 that have been already mapped to the analytics environment 1A23, the data sources 1A01 that are available in the customer data platform, what data sources have been mapped, my integration hub, what data sources have been mapped to my master data management solution. Additionally or alternatively, the data analysis may include the app server(s) 1A20 and/or analytics environment 1A23 performing various artificial intelligence (AI) and/or machine learning (ML) tasks using the refined data. In some implementations, a client-side analytics app 1A30 may be configured to integrate with, or otherwise access the analytics environment 1A23. In one example, the client-side analytics app 1A30 may be part of a business intelligence (BI) analytics app/service 1A30. Additionally or alternatively, the data analysis may involve data discovery tools, which provide analysts with insight about the contents of collected data assets and help to characterize and collect structural metadata as well as determine whether the data asset contains sensitive information that is subject to protection.

The app server(s) 1A20 also provide access to the data and/or the analyzed data to various data consumers 1A03. The access may be provided using multiple mechanisms such as search/query execution, pub/sub messaging, data virtualization, APIs, data services, and/or the like. For example, the app server(s) 1A20 may provide a natural language search application that enables data consumers 1A03 to search through all of the enterprise's data resources and access desired data assets according to topics and/or other criteria. Additionally or alternatively, ML automation may be used to provide data discovery recommendations to dashboard 1A31a and/or performance monitor 1A31b to help data consumers 1A03 discover data that can best assist them in reaching desired goals. Additionally or alternatively, ML automation may be used to drive various aspects of the apps/services 1A30.

One downside to using conventional data catalogs 1A02 is that they are usually set up manually by a data governance manager capturing a list of what business information is found in an app 1A30 (e.g., a modernization of the spreadsheet approach). Alternatively, data catalogs can be populated through metadata imports. The metadata imports include database schemas containing object names or integration flows that show what data is coming from an application's objects into a database. Regardless of how a data catalog is populated, the data can quickly go out of date. Manually updating or importing metadata into the catalog 1A02 implies it is static by its nature, with the catalog 1A02 being only as recent as the last maintenance process. Metadata changes in one system (e.g., app/service 1A30) may not be recognized by the catalogue until months later, causing data quality gaps.

Other types of metadata repositories are actively used to deliver certain types of business value. For these metadata repositories, the enterprise defines a target structure using business terminology and then maps these objects to database structures and API structures. These metadata repositories can be queried for information, but only for application specific information for a given instance. A downside to using these types of metadata repositories is that they are disconnected from other repositories, which means that only a limited amount of data and application-specific data types can be queried.

Additionally, different apps/services 1A30 may represent data concepts differently, such as by using different object and field names. For example, app/service 1A30-1 may represent a tax identifier (ID) object as "tax_id", app/service 1A30-2 may represent a tax ID object as "TIN", and app/service 1A30-N may represent a tax ID object as "SSN" (for social security number, which is also use for tax tracking purposes in some cases).

The present disclosure provides implementations that solve these challenges by providing one data source mapping across all apps/services 1A30. For example, the implementations discussed herein avoid making individual mappings for a first object from a marketing application (app) and/or service (e.g., an order object in Salesforce® Commerce Cloud® to Salesforce® data manager) for one purpose, to an analytics app/service (e.g., Tableau®, MicroStrategy, etc.) for a second purpose, to a data integration app/service (e.g., MuleSoft®, Informatica PowerCenter, etc.) for a third purpose, to a CDP app/service (e.g., Salesforce® Audience Studio®, Segment, etc.) for a fourth purpose, and so forth, when each of these individual mappings use the same data source (e.g., the same object into the order object).

Disclosed implementations include an application independent metadata repository (e.g., repositories 1A21) with a Canonical Data Model (CDM) 1A50 that maintains a single set of use case agnostic mappings between data sources 1A01 and the CDM 1A50 and from the CDM 1A50 to different apps/services 1A30. The physical mappings of a particular entity in the CDM 1A50 are used to determine the different apps/services 1A30 that are mapped to it and what are the objects or data structures that that particular data source 1A01 is exposing. The technical names or developer-derived names of different data structures/objects are mapped to the CDM 1A50, which is system and app/service 1A30 agnostic to enable effective metadata discovery. In these ways, the data catalog 1A02 can drive data computation processes, such as how a data source 1A01 specific value (e.g., CountryName=United States or US) should map and be standardized using an enterprise-defined standard (e.g. CountryCode=USA).

In various implementations, the CDM 1A50 is a database object or other data structure that comprises one or more Authenticated Registered Data Source Identifier (ards_id)-Physical Object inventory (poi) pairs. Here, the ards_id is a unique identifier assigned to, or otherwise associated with an individual data source 1A01 during a suitable on-boarding process, and the poi is a name or identifier of an object in a particular app/service 1A30. The ards_id-poi pairs may be persisted in heterogeneous metadata repositories (e.g., repositories 1B21 in FIG. 1B) and can be browsed using either entity view, such as by viewing from the perspective of app/service 1A30-1, app/service 1A30-2, . . . , app/service 1A30-N. These implementations may be used where each app/service 1A30 provides some means for unique identification of data sources 1A01 in order to have secure connectivity and interoperability. This allows identification of when two or more app/services 1A30 are actually both pulling from the same data sources 1A01 and/or the cloud computing instances. Even in implementations where unique identification of data sources 1A01 were not possible, all the instances could still be queried but the different entities would still need to be logically de-duplicated or differentiated from one another.

In some implementations, the app/service-independent metadata repositories 1A21 stores the CDM 1A50 as the starting point, that maintains the use case agnostic mappings between data sources 1A01 and the CDM 1A50 (see e.g., FIG. 1A). Then, the adoption of the CDM 1A50 across app/service 1A30 (see e.g., FIG. 1B) standardizes data thereby providing a Rosetta stone for data standards, policies, integration rules, and data catalogs 1A02. This allows conventional data catalogs to implement the CDM 1A50 with little hardware and/or software updates, and allows for new apps/services 1A30 to be implemented with little complexity.

In various implementations, the data catalog 1A02 may operate a metadata exchange federation framework that can query multiple metadata repositories (e.g., repositories 1B21 in FIG. 1B) to identify and unify data sources 1A01 that may be mapped and available to a single app/service 1A30, and demonstrate what other data assets are available to the enterprise are not available within that app/service 1A30. Data Federation can be used to obtain available data assets across connected, trusted metadata repositories (e.g., repositories 1B21 in FIG. 1B), and perform overlap and delta analysis in (near) real-time. In some implementations, the data catalog 1A02 can be served both based on persisted metadata and federated queries.

Figure 1B:
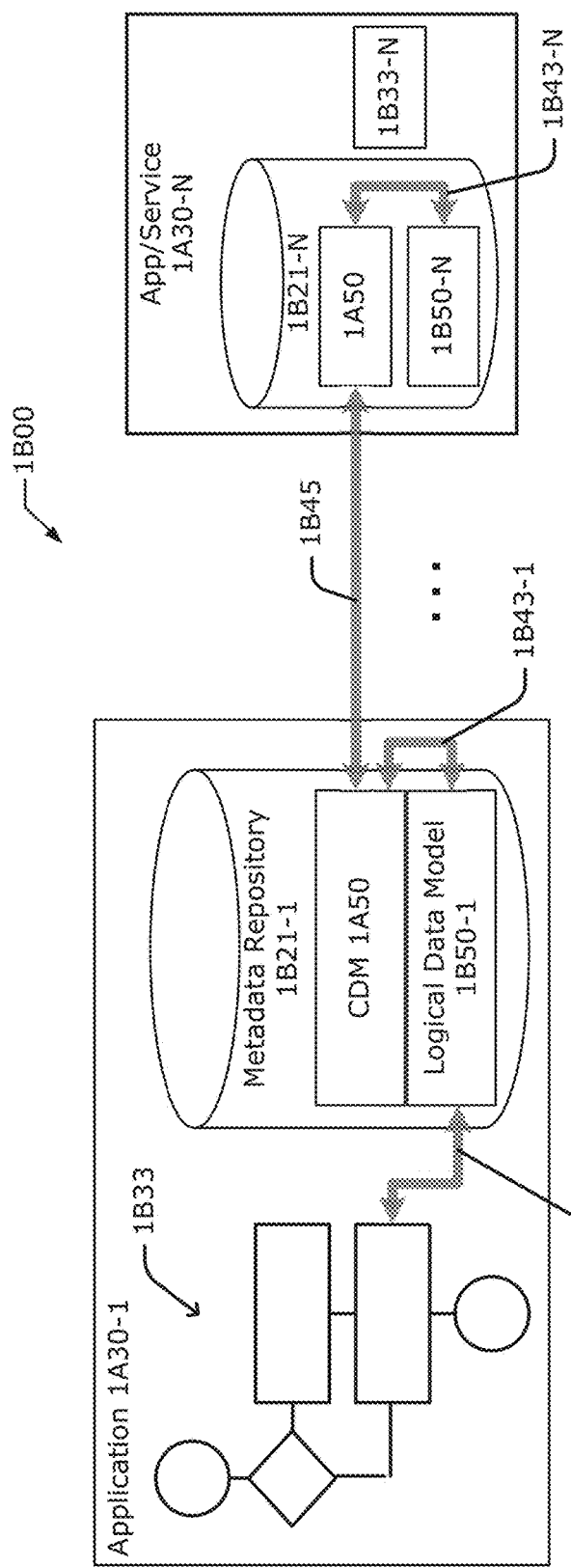
FIG. 1B illustrates an example canonical data model (CDM) reference architecture according to some example implementations.

FIG. 1B shows example CDM architecture 1B00A according to some implementations. Each app/service 1A30 includes various logic and physical entities 1B33, and a metadata repository 1B21 where a logical data model 1B50 of the app/service 1A30 resides. For example, in CDM architecture 1B00A, the app/service 1A30-1 includes a metadata repository 1B21-1 including logical data model 1B50-1 and the app/service 1A30-N includes a metadata repository 1B21-N including logical data model 1B50-N. Multiple physical entities/elements 1B33 are represented in the logical data model 1B50. For example, elements of the app/service's 1A30-1 logical data model 1B50 are mapped 1B41 to respective physical structures/entities 1B33 of the app/service 1A30.

On top of the logical data model 1B50 is the CDM 1A50, which includes a one-to-one mapping 1B43 between each entity/element in the logical data model 1B50 within the app/service's 1A30 metadata repository 1B21 to an entity/element in the CDM 1A50. For example, in CDM architecture 1B00A, each entity/element in the logical data model 1B50-1 within the app/service's 1A30-1 metadata repository 1B21-1 is mapped 1B43-1 to an entity/element in the CDM 1A50, and each entity/element in the logical data model 1B50-N within the app/service's 1A30-N metadata repository 1B21-N is mapped 1B43-N to an entity/element in the CDM 1A50. As alluded to previously, the mappings 1B41 may be respective ards_id-poi pairs.

When the CDM 1A50 is reflected in multiple apps/services 1A30 and multiple metadata repositories 1B21, relationships 1B45 are made between elements/entities of multiple apps/services 1A30. For example, a relationship 1B45 between app/service's 1A30-1 logical data model 1B50-1 and app/service's 1A30-N logical data model 1B50-N is resolved 1B45 through the CDM 1A50. This allows federated queries to be made that can go from app/service 1A30-1 through the common metadata definitions of the CDM 1A50 to app/service 1A30-N, and vice versa. Then, the logical entity/element information and various map-to-app/service's 1A30-N equivalent logical entity/element can be retrieved based on the query.

In some implementations, the different metadata repositories 1B21 may have different unique identification mechanisms, as well as different ways of maintaining mappings 1B43. In one example implementation, the cloud computing service may have a global directory of enterprises (or global directory tenants for multi-tenant implementations, such as Salesforce® Global Directory of Tenants (GDoT) tenant IDs for Salesforce data sources) that is used to register and uniquely identify individual data sources 1A01 that are used for integration between systems and/or apps/services 1A30. With this unique identification of data sources 1A01, bringing forth all available data sources 1A01 of a given enterprise/entity is a relatively straightforward exercise that can be done in memory by pointing to any other securely connected metadata repository 1B21.

Additionally or alternatively, in some implementations, metadata change events for systems and/or apps/services 1A30 can be used to emit changes, from object, field, policy, standard additions, changes, removals, that can be detected, assessed and acted upon by other systems and/or apps/services 1A30.

1.2. Cloud Information Model Implementations

In one example implementation, the Cloud Information Model is used as the CDM 1A50.

Figure 1C:
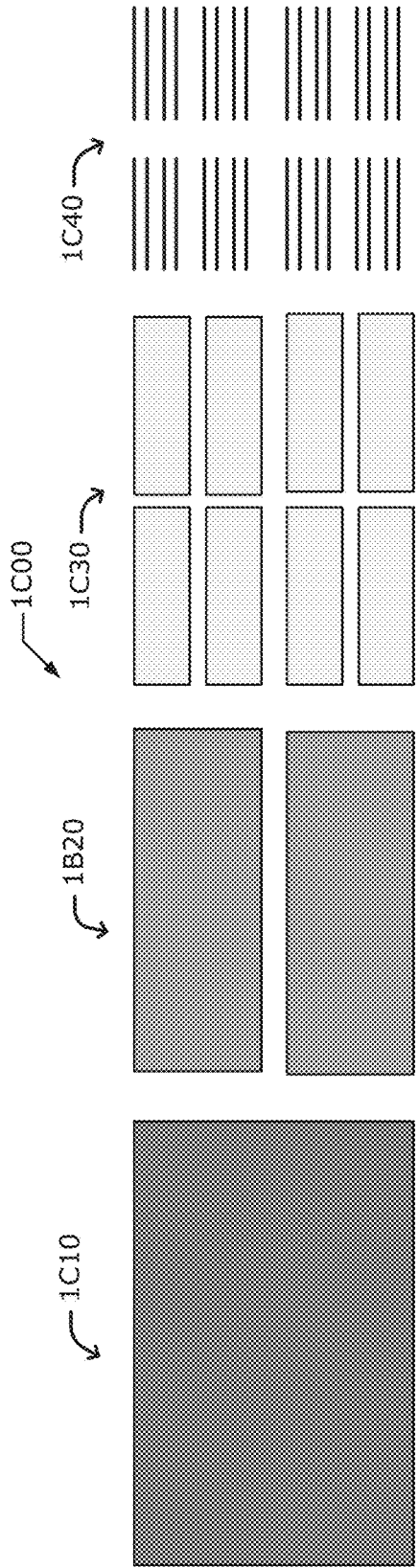
FIG. 1C illustrates an example Cloud Information Model according to some example implementations.

FIG. 1C illustrates an example Cloud Information Model (CIM) 1C00 according to some example implementations. The CIM 1C00 is a schema (or model) used to communicate between connected data sources 1A01 with different data structures and formats. CIM 1C00 uses connectors, application programming interfaces (APIs), and/or other mappings to connect applications and data. The CIM 1C00 creates standardized data models that can be used in common scenarios based on subject areas (e.g., sales orders). This creates a standard way for platforms using the CIM 1C00 to map to each other, making data mapping easier. If data mapping is easier, identifying the same enterprise/organization in multiple systems becomes easier.

The CIM 1C00 is organized into various components including subject area 1C10, entity groups 1C20, entities 1C30, and attributes 1C40. A subject area 1C10 is a major concept (e.g., business concept) identified by the CIM consortium including, for example, Party, Payment, Payment Method, Product, Sales Order, and Shipment. A Party defines an entity an enterprise has a relationship with and how that relationship is manifested (e.g., a customer and supplier along with their phone number and email). A Payment is an object for a submitted payment, which includes information about whether a submitted payment was successfully processed or not. A Payment Method is an object for a method of paying for a product or service, like a credit card or check. A Product is an object for an item to be sold or any part of a product that needs to be tracked for service purposes. A Sales Order is a document generated by a seller to indicate the specific products/services a buyer will be receive during a sale. A Shipment is an object for tracking the physical packages actually shipped for an order.

Each subject area 1C10 contains one or more entity groups 1C20. The entity groups 1C20 are logical groupings of related entities within a subject area, such as Account. Each entity group 1C20 contains one or more entities 1C30. An entity 1C30 is a unique object that an organization collects information about, such as an Account Contact. In some implementations, an entity 1C30 is analogous to a standard database table or database object. An attribute 1C40 is a unique characteristic of an entity 1C30, such as Account Id or Contact Email. In some implementations, an attribute 1C40 is analogous to a standard database field within a table or database object.

In addition, the CIM 1C00 customizes and extends entities into further groupings using supertypes and subtypes. A supertype is an entity that is extended by subtype entities, and defines common attributes for similar concepts. A subtype is an entity that extends another entity, and inherits the attributes from its super type entity. For example, Individual is a subtype entity of the Party supertype entity.

Additional aspects of the CIM are discussed in Cloud Information Model specification version 0.1, available at: https://cloudinformationmodel.org, which is hereby incorporated by reference in its entirety. In another example implementation, the CDM 1A50 is based on the Open Data Initiative (ODI) and/or the Common Data Model available at: https://github.com/microsoft/CDM and https://docs.microsoft.com/en-us/common-data-model/, each of which are hereby incorporated by reference in their entireties.

1.3. Example CDM Sequence Flows

Figure 2A:
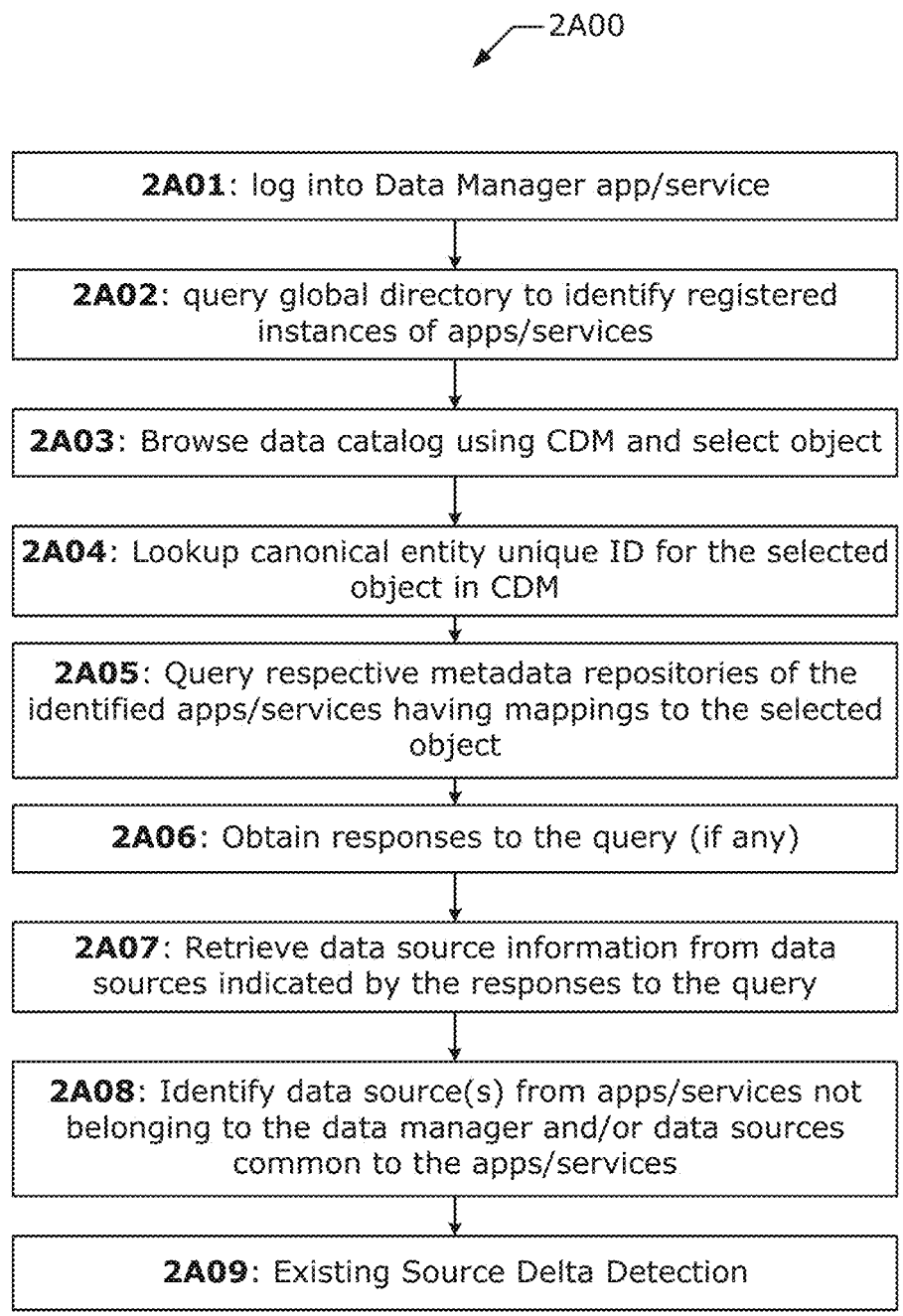
FIGS. 2A and 2B illustrate example process/procedures according to some example implementations.
Figure 2B:
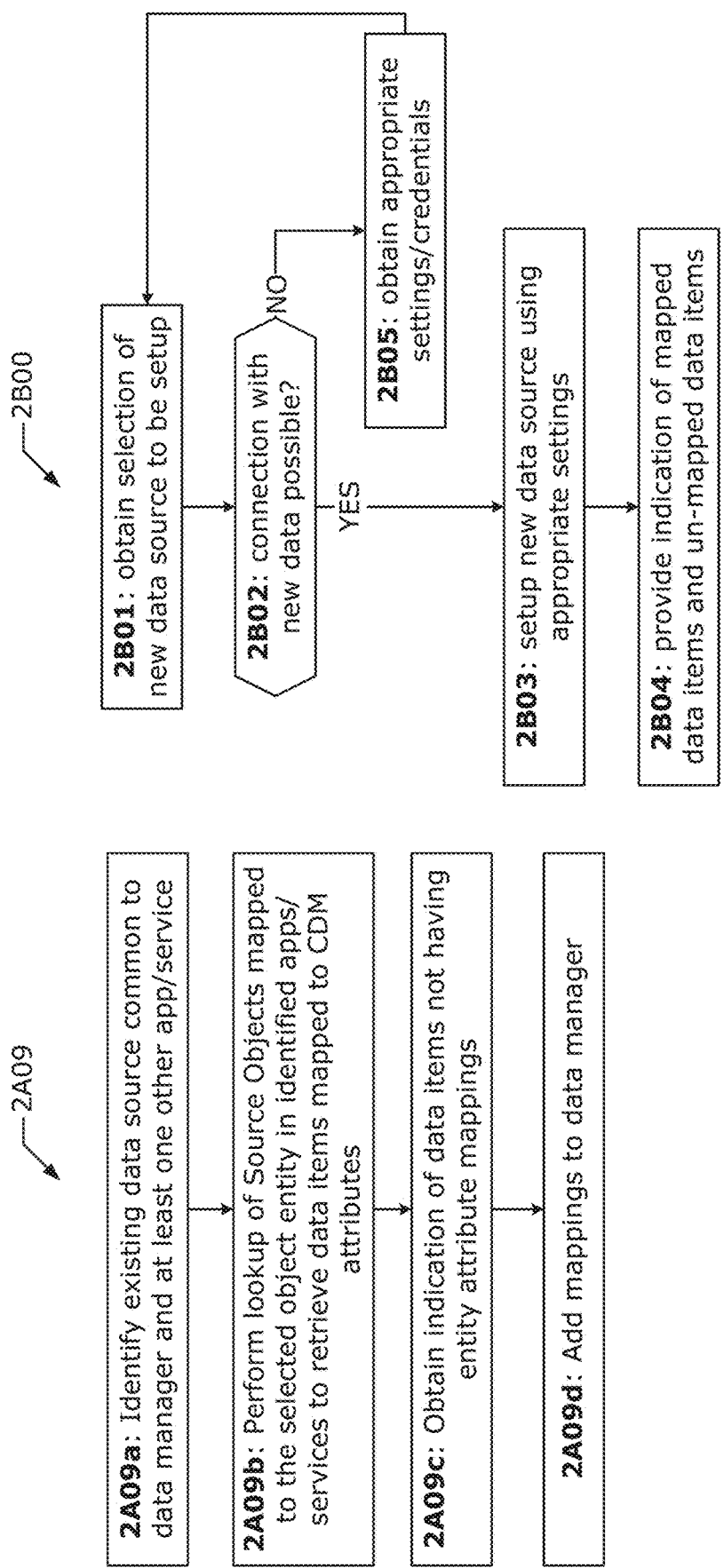

FIGS. 2A and 2B show example CDM sequence flows 2A00, 2A09, and 2B00 according to some implementations. By way of example, the CDM sequence flows 2A00, 2A09, and 2B00 are described as being performed by various elements/entities discussed previously with respect to FIGS. 1A-1C, including a Data Management app 1A30-1, an integration app 1A30-2, an analytics app 1A30-3, and a Customer Data Platform (CDP) app 1A30-4. The various apps/services 1A30 may unify data across data sources for different technical and/or business reasons.

CDM sequence flow 2A00 begins at operation 2A01 where a data architect logs in to the data manager 1A30-1 for master data management (MDM) that may bring data from different systems of record and references. In one example scenario, the data architect wants to understand a customer across all of their order interaction history, regardless of where that data may be located/stored. At operation 2A02, the data manager 1A30-1 is used to query a global directory of enterprises (or tenants in multi-tenant implementations) to identify what other (enterprise) apps/services 1A30 may be in the same enterprise/tenant group as the Data Manager app 1A30-1. In this example, Data Manager app 1A30-1 discovers there are registered instances of various apps/services 1A30-2, 1A30-3, 1A30-4, and so forth, each of which have their own metadata repositories 1B21.

At operation 2A03, the data architect uses the data manager 1A30-1 to browse the data catalog 1A02 using the CDM 1A50 (e.g., CIM 1C00) entities, and chooses a suitable object (e.g., an order object, or "Order"). At operation 2A04, the data architect uses the data manager 1A30-1 to look up, search for, or otherwise query for a canonical entity unique identifier (ID) for the selected object (e.g., Order), and at operation 2A04x, the data architect uses the data manager 1A30-1 to submit a distributed query against respective metadata repositories 1B21 of the apps/services 1A30-2, 1A30-3, 1A30-4 if any data source 1A01 have been mapped to the selected object (e.g., Order) business entity in their structures.

At operation 2A05, the data manager 1A30-1 obtains responses to the query from individual apps/services 1A30. In this example, the integration app 1A30-2 and CDP app 1A30-4 indicate they have mappings to the Order entity, where the integration app 1A30-2 indicates having two data sources 1A01 and the CDP app 1A30-4 indicates having one data source 1A01.

At operation 2A06, the data manager 1A30-1 retrieves data source information from the data sources 1A01 indicated by the responses to the query. In some implementations, the data manager 1A30-1 retrieves data source information from connected apps 1A30 to compare to data sources 1A01 it has registered to identify what has not been registered or mapped (e.g., net new sources to incorporate). In these implementations, the data manager 1A30-1 performs a multi-pass comparison of what may be a new source using the data source unique ID (e.g., GDoT tenant IDs for Salesforce data sources) and/or connector parameters (e.g., an integration user login ID/credentials, OAuth settings, or the like) for non-third party data sources 1A01.

At operation 2A07, the data manager 1A30-1 identifies data source(s) 1A01 from apps/services 1A30 not belonging to the data manager 1A30-1 and/or data sources 1A01 common to the various apps/services 1A30. In this example, the data manager 1A30-1 identifies source 2 from the integration app 1A30-2 as a source it does not have. Additionally, the data manager 1A30-1 identifies source 1 from the integration app 1A30-2 and source 1 from the CDP app 1A30-4 as being the same data source 1A01, which may have mappings not included in the logical data model 1B50-1 of the data manager 1A30-1.

Then, the data manager 1A30-1 performs an Existing Source Delta Detection flow 2A09 as shown by FIG. 2B. Existing Source Delta Detection flow 2A09 includes operations 2A09a-2A09d. At operation 2A09a, the data manager 1A30-1 identifies existing data source(s) 1A01 common to data manager 1A30-1 and at least one other app/service 1A30. For example, the end user (e.g., data architect) may use the data manager 1A30-1 to look at existing data source(s) 1A01 in the data manager 1A30-1 that is also available in the integration app 1A30-2 and the CDP app 1A30-4.

At operation 2A09b, the data manager 1A30-1 (or some other data catalog entity 1A02) performs a look up of Source Objects mapped to the selected object (e.g., Order business entity) in the identified apps/services 1A30 (e.g., the integration app 1A30-2 and the CDP app 1A30-4), to retrieve a list of data items (e.g., records, fields, information elements, tags, data elements, etc.) that have been mapped to CDM 1A50 attributes of the selected object.

At operation 2A09c, if there are (business) object entity attributes with mappings in the identified apps/services 1A30 (e.g., the integration app 1A30-2 and the CDP app 1A30-4) that are not mapped in the data manager 1A30-1 (e.g., using Union logic, a join query filter, or the like), an indicator is provided to end user that there are additional fields that can be included. In some implementations, the data manager 1A30-1 may include a user interface allowing the end user (e.g., data architect) to chooses to view what data source(s) 1A01 and/or data items may be new.

At operation 2A09d, the data manager 1A30-1 adds any missing data item mappings between the data manager 1A30-1 logical data model 1B50 entities and the logical data model 1B50 entities of the identified apps/services 1A30. In one example implementation, based on metadata security settings, compares source object data items (e.g., fields, etc.) mapped to (business) object entity attributes in the identified apps/services 1A30 (e.g., the integration app 1A30-2 and the CDP app 1A30-4) to object data items (e.g., fields, etc.) known to the data manager 1A30-1. If there are existing fields not mapped, the end user (e.g., data architect) is prompted if they want to add mappings to the data manager 1A30-1. If the source object fields are not in the data manager 1A30-1 metadata repository 1B21, the end user (e.g., data architect) is may be prompted if they want to refresh source metadata to identify if any new attributes may be available.

FIG. 2B also shows a New Source Detection flow 2B00 according to various implementations. The New Source Detection flow 2B00 may take place before, during, simultaneously with, or after performance of the CDM sequence flow 2A00 and/or the Existing Source Delta Detection flow 2A09.

The New Source Detection flow 2B00 begins at operation 2B01 where the data manager 1A30-1 obtains a selection of a new data source 1A01 to be setup. Continuing with the example of the flows 2A00 and 2A09, the end user (e.g., data architect) selects the integration app 1A30-2, Source A to setup as a new data source 1A01. At operation 2B02, the data manager 1A30-1 determines whether the selected new data source 1A01 can be connected with the data manager 1A30-1. In some implementations, the data manager 1A30-1 compares authentication and authorization settings of the integration app 1A30-2, Source A to determine if it can be securely connected in the data manager 1A30-1. If yes, the data manager 1A30-1 sets up the new data source 1A01 using the appropriate settings. For example, the security settings may be setup automatically using appropriate credential settings and/or tokens. If not, at operation 2B05, the data manager 1A30-1 may obtain the appropriate security settings and/or credentials to add the new data source 1A01. In some implementations, the end user is prompted to capture the necessary Authentication ("AuthN") and Authorization ("AuthZ") parameters to setup the new data source 1A01. Additionally or alternatively, the data manager 1A30-1 may loop back to operation 2B01 to select another new data source 1A01 to setup.

Once data source is registered, at operation 2B04 the data manager 1A30-1 provides visualizations of the available mapped data items (e.g., fields, etc.) in one or more other data sources 1A01 (e.g., Source B) and other un-mapped mapped data items (e.g., fields, etc.). In some implementations, the data manager 1A30-1 includes a user interface that indicates potential value or priority/ranking values to assist usability. Additionally or alternatively, the user interface of the data manager 1A30-1 allows the end user to choose to map fields to manually setup.

1.4. Example Implementations

One example implementation includes a method for providing data catalog services, the method comprising: obtaining a query for data sources related to a first application (app), the first app having a first logical data model in a first metadata repository; identifying, in the first logical data model, first mappings of first elements of the first app to corresponding canonical elements of a canonical data model (CDM); determining, in a second logical data model, second mappings of second elements of the second logical data model to the identified canonical elements; and providing, in response to the query, a set of mappings of the first elements to the determined second elements as the data sources related to the first app.

The example implementations additionally or alternatively includes identifying applications and services (apps/services) in a same group as the first app. In this example implementation, identifying the apps/services in the same group as the first app comprises: querying a global directory of enterprises of a cloud computing service or a global directory of tenants in multi-tenant system.

The example implementations additionally or alternatively includes obtaining a selection of an object defined by the first logical data model; and identifying a canonical entity unique identifier (ID) for the selected object. The example implementations additionally or alternatively includes submitting a distributed query against respective metadata repositories of the identified apps/services having one or more data sources mapped to the selected object in the respective metadata repositories; and obtaining individual responses to the distributed query from respective ones of the identified apps/services, the individual responses indicating the one or more data sources mapped to the selected object.

The example implementations additionally or alternatively includes obtaining data source information from the one or more data sources indicated by the individual responses; and identifying data sources of the one or more data sources not already mapped to the first elements based on the data source information.

The example implementations additionally or alternatively includes identifying data sources of the one or more data sources common to the first app and a second app based on the data source information, the second app being associated with the second logical data model; determining one or more source objects mapped to the selected object in the identified apps/services; and generating a list of data items of the selected object that have been mapped to one or more canonical elements.

The example implementations additionally or alternatively includes comparing data elements of the source object that are mapped to data elements of objects in the identified apps/services with data elements of the selected object; and indicating any of the data elements of the source object with mappings in the identified apps/services that are not also mapped to the data elements of the selected object. The example implementations additionally or alternatively includes updating the first logical data model to include the indicated data elements.

The example implementations additionally or alternatively includes comparing authentication and authorization settings of one or more data sources associated with the second app with credentials associated with the first app; and setting up the one or more data sources using the credentials based on the comparison.

Another example implementation includes a non-transitory machine-readable storage medium that provides instructions that, if executed by one or more processors, are configurable to cause said one or more processors to perform operations comprising the method of any of the aforementioned example implementations or according to any other example implementation discussed herein.

Another example implementation includes an apparatus comprising: one or more processors; and a non-transitory machine-readable storage medium that provides instructions that, if executed by the one or more processors, are configurable to cause the apparatus to perform operations comprising the method of any of the aforementioned example implementations or according to any other example implementation discussed herein.

Another example implementation includes an API defining functions, methods, variables, data structures, and/or protocols for the instructions of any of the aforementioned example implementations.

Another example implementation includes a signal generated as a result of executing the instructions of any of the aforementioned example implementations. Another example implementation includes an electromagnetic signal carrying the instructions of any of the aforementioned example implementations.

Another example implementation includes a unit of data generated as a result of executing the instructions of any of the aforementioned example implementations. In some examples, the unit of data of this example implementation is a datagram, network packet, data frame, data segment, a Protocol Data Unit (PDU), a Service Data Unit (SDU), a message, an information element, or a database object. Another example implementation includes a signal encoded with the aforementioned unit of data.

2. Example Electronic Devices and Environments 2.1. Example Electronic Devices and Machine-Readable Media One or more parts of the aforementioned implementations may include software. Software is a general term whose meaning can range from part of the code and/or metadata of a single computer program to the entirety of multiple programs. A computer program (also referred to as a program) comprises code and optionally data. Code (sometimes referred to as computer program code or program code) comprises software instructions (also referred to as instructions). Instructions may be executed by hardware to perform operations. Executing software includes executing code, which includes executing instructions. The execution of a program to perform a task involves executing some or all of the instructions in that program.

An electronic device (also referred to as a device, computing device, computer, etc.) includes hardware and software. For example, an electronic device may include a set of one or more processors coupled to one or more machine-readable storage media (e.g., non-volatile memory such as magnetic disks, optical disks, read only memory (ROM), Flash memory, phase change memory, solid state drives (SSDs)) to store code and optionally data. For instance, an electronic device may include non-volatile memory (with slower read/write times) and volatile memory (e.g., dynamic random-access memory (DRAM), static random-access memory (SRAM)). Non-volatile memory persists code/data even when the electronic device is turned off or when power is otherwise removed, and the electronic device copies that part of the code that is to be executed by the set of processors of that electronic device from the non-volatile memory into the volatile memory of that electronic device during operation because volatile memory typically has faster read/write times. As another example, an electronic device may include a non-volatile memory (e.g., phase change memory) that persists code/data when the electronic device has power removed, and that has sufficiently fast read/write times such that, rather than copying the part of the code to be executed into volatile memory, the code/data may be provided directly to the set of processors (e.g., loaded into a cache of the set of processors). In other words, this non-volatile memory operates as both long term storage and main memory, and thus the electronic device may have no or only a small amount of volatile memory for main memory. Furthermore, computer-readable media encoded with the software/program code may be packaged with a compatible device or provided separately from other devices (e.g., via the Internet or other network). Any such computer-readable medium may reside on or within a single computing device, an entire computer system, or multiple computing systems in a computing network, and may be among other computer-readable media within a system or network.

In addition to storing code and/or data on machine-readable storage media, typical electronic devices can transmit and/or receive code and/or data over one or more machine-readable transmission media (also called a carrier) (e.g., electrical, optical, radio, acoustical or other forms of propagated signals—such as carrier waves, and/or infrared signals). For instance, typical electronic devices also include a set of one or more physical network interface(s) to establish network connections (to transmit and/or receive code and/or data using propagated signals) with other electronic devices. Thus, an electronic device may store and transmit (internally and/or with other electronic devices over a network) code and/or data with one or more machine-readable media (also referred to as computer-readable media).

Software instructions (also referred to as instructions) are capable of causing (also referred to as operable to cause and configurable to cause) a set of processors to perform operations when the instructions are executed by the set of processors. The phrase "capable of causing" (and synonyms mentioned above) includes various scenarios (or combinations thereof), such as instructions that are always executed versus instructions that may be executed. For example, instructions may be executed: 1) only in certain situations when the larger program is executed (e.g., a condition is fulfilled in the larger program; an event occurs such as a software or hardware interrupt, user input (e.g., a keystroke, a mouse-click, a voice command); a message is published, etc.); or 2) when the instructions are called by another program or part thereof (whether or not executed in the same or a different process, thread, lightweight thread, etc.). These scenarios may or may not require that a larger program, of which the instructions are a part, be currently configured to use those instructions (e.g., may or may not require that a user enables a feature, the feature or instructions be unlocked or enabled, the larger program is configured using data and the program's inherent functionality, etc.). As shown by these exemplary scenarios, "capable of causing" (and synonyms mentioned above) does not require "causing" but the mere capability to cause. While the term "instructions" may be used to refer to the instructions that when executed cause the performance of the operations described herein, the term may or may not also refer to other instructions that a program may include. Thus, instructions, code, program, and software are capable of causing operations when executed, whether the operations are always performed or sometimes performed (e.g., in the scenarios described previously). The phrase "the instructions when executed" refers to at least the instructions that when executed cause the performance of the operations described herein but may or may not refer to the execution of the other instructions.

Electronic devices are designed for and/or used for a variety of purposes, and different terms may reflect those purposes (e.g., user devices, network devices). Some user devices are designed to mainly be operated as servers (sometimes referred to as server devices), while others are designed to mainly be operated as clients (sometimes referred to as client devices, client computing devices, client computers, or end user devices; examples of which include desktops, workstations, laptops, personal digital assistants, smartphones, wearables, augmented reality (AR) devices, virtual reality (VR) devices, mixed reality (MR) devices, etc.). The software executed to operate a user device (typically a server device) as a server may be referred to as server software or server code), while the software executed to operate a user device (typically a client device) as a client may be referred to as client software or client code. A server provides one or more services (also referred to as serves) to one or more clients.

It should also be understood that some of the disclosed implementations can be embodied in the form of various types of hardware, software, firmware, middleware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Python, PyTorch, NumPy, Ruby, Ruby on Rails, Scala, Smalltalk, Java™, C++, C#, "C", Kotlin, Swift, Rust, Go (or "Golang"), ECMAScript, JavaScript, TypeScript, Jscript, ActionScript, Server-Side JavaScript (SSJS), PHP, Pearl, Lua, Torch/Lua with Just-In Time compiler (LuaJIT), Accelerated Mobile Pages Script (AMPscript), VBScript, JavaServer Pages (JSP), Active Server Pages (ASP), Nodejs, ASP.NET, JAMscript, Hypertext Markup Language (HTML), extensible HTML (XHTML), Extensible Markup Language (XML), XML User Interface Language (XUL), Scalable Vector Graphics (SVG), RESTful API Modeling Language (RAML), wiki markup or Wikitext, Wireless Markup Language (WML), Java Script Object Notion (JSON), Apache® MessagePack™, Cascading Stylesheets (CSS), extensible stylesheet language (XSL), Mustache template language, Handlebars template language, Guide Template Language (GTL), Apache® Thrift, Abstract Syntax Notation One (ASN.1), Google® Protocol Buffers (protobuf), Bitcoin Script, EVM® bytecode, Solidity™, Vyper (Python derived), Bamboo, Lisp Like Language (LLL), Simplicity provided by Blockstream™, Rholang, Michelson, Counterfactual, Plasma, Plutus, Sophia, Salesforce® Apex®, Salesforce® Visualforce®, Salesforce® Lightning®, Salesforce® Wave™ Dashboard Designer, Salesforce® Force.com® IDE, Android® Studio™ integrated development environment (IDE), Apple® iOS® software development kit (SDK), and/or any other programming language or development tools including proprietary programming languages and/or development tools. Furthermore, some or all of the software components or functions described herein can utilize a suitable querying language to query and store information in one or more databases or data structures, such as, for example, Structure Query Language (SQL), object query language (OQL), Salesforce® OQL (SOQL), Salesforce® object search language (SOSL), Salesforce® analytics query language (SAQL), and/or other query languages. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium, flash memory, and the like, or any combination of such storage or transmission devices.

Figure 3A:
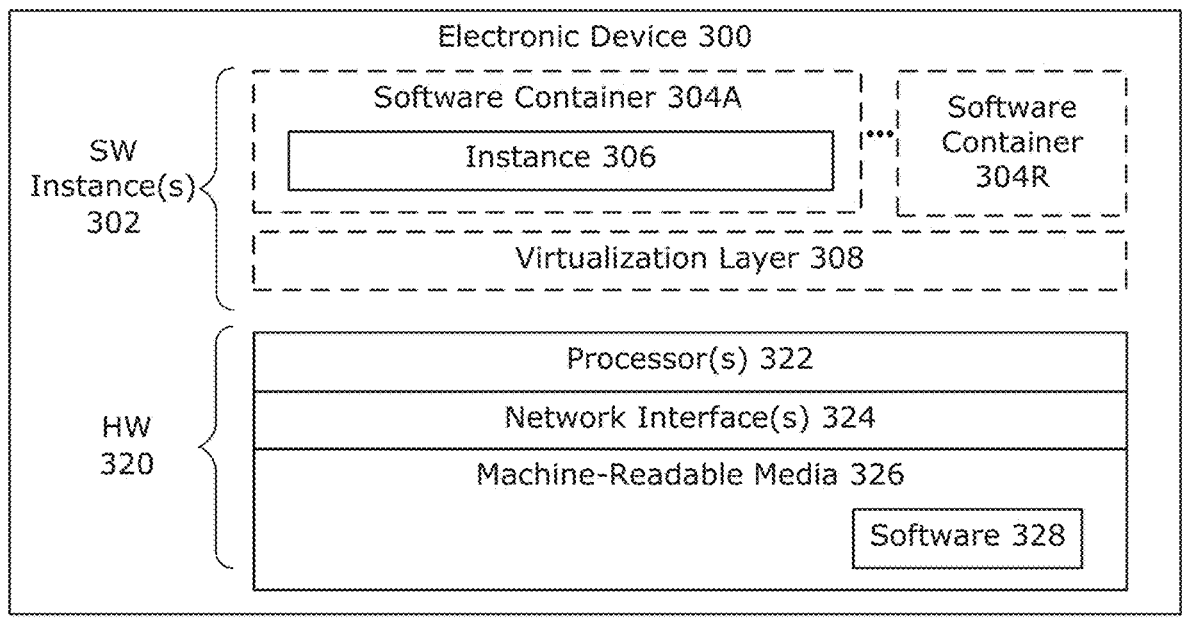
FIG. 3A illustrates an electronic device according to some example implementations.

FIG. 3A is a block diagram illustrating an electronic device 300 according to some example implementations. FIG. 3A includes hardware 320 comprising a set of one or more processor(s) 322, a set of one or more network interfaces 324 (wireless and/or wired), and machine-readable media 326 having stored therein software 328 (which includes instructions executable by the set of one or more processor(s) 322). The machine-readable media 326 may include non-transitory and/or transitory machine-readable media. Each of the previously described clients and the Data Catalog/Canonical Data Model service(s) may be implemented in one or more electronic devices 300. In one implementation: 1) each of the clients is implemented in a separate one of the electronic devices 300 (e.g., in end user devices where the software 328 represents the software to implement clients to interface directly and/or indirectly with the XYZ service (e.g., software 328 represents a web browser, a native client, a portal, a command-line interface, and/or an application programming interface (API) or connectors based upon protocols such as Simple Object Access Protocol (SOAP), Representational State Transfer (REST), etc.)); 2) the Data Catalog/Canonical Data Model service(s) is/are implemented in a separate set of one or more of the electronic devices 300 (e.g., a set of one or more server devices where the software 328 represents the software to implement the Data Catalog/Canonical Data Model service(s)); and 3) in operation, the electronic devices implementing the clients and the Data Catalog/Canonical Data Model service(s) would be communicatively coupled (e.g., by a network) and would establish between them (or through one or more other layers and/or or other services) connections for submitting selections of queries for data sources and/or object mappings, and requests to update/add new data sources to the Data Catalog/Canonical Data Model service(s) and returning indications of the existing/new/updated data sources that are available to the clients. Other configurations of electronic devices may be used in other implementations (e.g., an implementation in which the client and the Data Catalog/Canonical Data Model service(s) are implemented on a single one of electronic device 300).

During operation, an instance of the software 328 (illustrated as instance 306 and referred to as a software instance; and in the more specific case of an application, as an application instance) is executed. In electronic devices that use compute virtualization, the set of one or more processor(s) 322 typically execute software to instantiate a virtualization layer 308 and one or more software container(s) 304A-304R (e.g., with operating system-level virtualization, the virtualization layer 308 may represent a container engine (e.g., Docker Engine by Docker, Inc. or rkt in Container Linux by Red Hat, Inc.) running on top of (or integrated into) an operating system, and it allows for the creation of multiple software containers 304A-304R (representing separate user space instances and also called virtualization engines, virtual private servers, or jails) that may each be used to execute a set of one or more applications; with full virtualization, the virtualization layer 308 represents a hypervisor (sometimes referred to as a virtual machine monitor (VMM)) or a hypervisor executing on top of a host operating system, and the software containers 304A-304R each represent a tightly isolated form of a software container called a virtual machine that is run by the hypervisor and may include a guest operating system; with para-virtualization, an operating system and/or application running with a virtual machine may be aware of the presence of virtualization for optimization purposes). Again, in electronic devices where compute virtualization is used, during operation, an instance of the software 328 is executed within the software container 304A on the virtualization layer 308. In electronic devices where compute virtualization is not used, the instance 306 on top of a host operating system is executed on the "bare metal" electronic device 300. The instantiation of the instance 306, as well as the virtualization layer 308 and software containers 304A-304R if implemented, are collectively referred to as software instance(s) 302.

In some implementations, the electronic device 300 may include Trusted Compute resources that preserve data confidentiality, execution integrity and enforces data access policies. The Trusted Compute resources may be used to store cryptographic keys, digital certificates, credentials, and/or other sensitive information, and could be used to operate some aspects of an app. The Trusted Compute resources can be implemented using software-based cryptographic security guarantees (e.g., Zero-Knowledge Proofs), virtualization using user-level or OS-level isolation (e.g., "containerization" such as software container 304A) or virtualization (e.g., using VMs), Trusted Multi-Party-Compute (MPC) resources, or using a Trusted Execution Environment (TEE). In either embodiment, an app is capable of interfacing with the Trusted Compute resources using a suitable API. Where the Trusted Compute resources is/are implemented using secure enclaves, the app can also interface directly with the enclave of a secure application or other like entity, and/or interface with other enclaves.

A TEE is a hardware-based technology that executes only validated tasks, produces attested results, provides protection from malicious host software, and ensures confidentiality of shared encrypted data. The TEE operates as a protected area accessible to the processor(s) 322 to enable secure access to data and secure execution of instructions. In some implementations, the TEE may be a physical hardware device that is separate from other components of the electronic device 300 such as a secure-embedded controller, a dedicated SoC, or a tamper-resistant chipset or microcontroller with embedded processing devices and memory devices (sometimes referred to as a hardware security module (HSM) or a trusted platform module (TPM)). Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like. In other implementations, the TEE may be realized using secure enclaves, which are isolated regions of code and/or data within the processor and/or memory/storage circuitry of the electronic device 300. Only code executed within a secure enclave may access data within the same secure enclave, and the secure enclave may only be accessible using the secure application (which may be implemented by an application processor or a tamper-resistant microcontroller). Various implementations of the TEE, and an accompanying secure area in the processor(s) 322 or the machine-readable media 326 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the electronic device 300 through the TEE and the processor(s) 322.

Alternative implementations of an electronic device may have numerous variations from that described above. For example, customized hardware and/or accelerators might also be used in an electronic device 300.

2.2. Example Environment

Figure 3B:
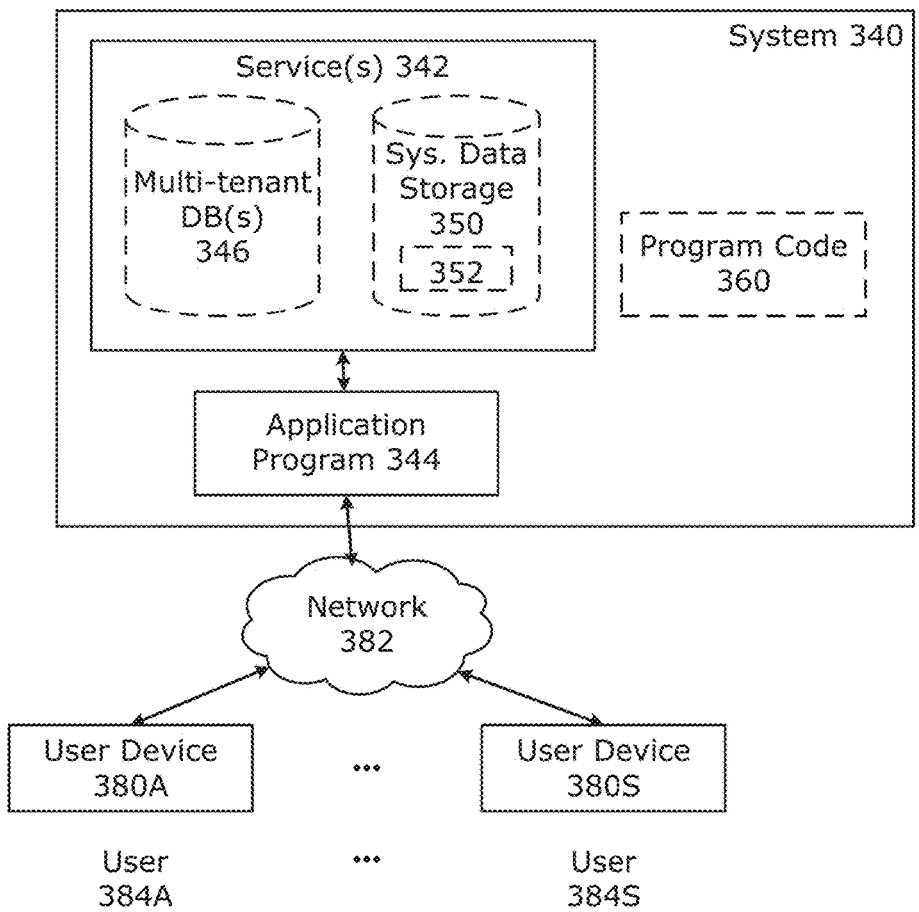
FIG. 3B illustrates a deployment environment according to some example implementations.

FIG. 3B shows an example deployment environment according to some example implementations. In this example, the system 340 includes hardware (e.g., a set of one or more server devices) and software to provide service(s) 342, including Data Catalog/Canonical Data Model service(s). In some implementations, the system 340 is in one or more datacenter(s). These datacenter(s) may be: 1) first party datacenter(s), which are datacenter(s) owned and/or operated by the same entity that provides and/or operates some or all of the software that provides the service(s) 342; and/or 2) third-party datacenter(s), which are datacenter(s) owned and/or operated by one or more different entities than the entity that provides the service(s) 342 (e.g., the different entities may host some or all of the software provided and/or operated by the entity that provides the service(s) 342). For example, third-party datacenters may be owned and/or operated by entities providing public cloud services (e.g., Amazon.com, Inc. (Amazon Web Services®), Google LLC (Google Cloud Platform®), Microsoft Corporation (Azure®)).

The system 340 is coupled to user devices 380A-380S (where A and S are numbers) over a network 382. The service(s) 342 may be on-demand services that are made available to one or more of the users 384A-384S working for one or more entities other than the entity which owns and/or operates the on-demand services (those users sometimes referred to as outside users) so that those entities need not be concerned with building and/or maintaining a system, but instead may make use of the service(s) 342 when needed (e.g., when needed by the users 384A-384S). The service(s) 342 may communicate with each other and/or with one or more of the user devices 380A-380S via one or more APIs (e.g., a REST API). In some implementations, the user devices 380A-380S are operated by users 384A-384S, and each may be operated as a client device and/or a server device. In some implementations, one or more of the user devices 380A-380S are separate ones of the electronic device 300 or include one or more features of the electronic device 300.

In some implementations, the system 340 is a multi-tenant system (also known as a multi-tenant architecture). The term multi-tenant system refers to a system in which various elements of hardware and/or software of the system may be shared by one or more tenants. A multi-tenant system may be operated by a first entity (sometimes referred to a multi-tenant system provider, operator, or vendor; or simply a provider, operator, or vendor) that provides one or more services to the tenants (in which case the tenants are customers of the operator and sometimes referred to as operator customers). A tenant includes a group of users who share a common access with specific privileges. The tenants may be different entities (e.g., different companies, different departments/divisions of a company, and/or other types of entities), and some or all of these entities may be vendors that sell or otherwise provide products and/or services to their customers (sometimes referred to as tenant customers). A multi-tenant system may allow each tenant to input tenant specific data for user management, tenant-specific functionality, configuration, customizations, non-functional properties, associated applications, etc. A tenant may have one or more roles relative to a system and/or service. For example, in the context of a customer relationship management (CRM) system or service, a tenant may be a vendor using the CRM system or service to manage information the tenant has regarding one or more customers of the vendor. As another example, in the context of Data as a Service (DaaS), one set of tenants may be vendors providing data and another set of tenants may be customers of different ones or all of the vendors' data. As another example, in the context of Platform as a Service (PaaS), one set of tenants may be third-party application developers providing applications/services and another set of tenants may be customers of different ones or all of the third-party application developers. In some implementations, the system 340 is a multi-tenant cloud computing platform. In some implementations, the system 340 provides a Communications as a Service (CaaS), Compute as a Service (CompaaS), DaaS, Database as a Service (DBaaS), Data Storage as a Service (DSaaS), Firewall as a Service (FaaS), Infrastructure as a Service (IaaS), Network as a Service (NaaS), Platform as a Service (PaaS), Security as a Service, Software as a Service (SaaS), and/or other like cloud services.

Multi-tenancy can be implemented in different ways. In some implementations, a multi-tenant architecture may include a single software instance (e.g., a single database instance) which is shared by multiple tenants; other implementations may include a single software instance (e.g., database instance) per tenant; yet other implementations may include a mixed model; e.g., a single software instance (e.g., an application instance) per tenant and another software instance (e.g., database instance) shared by multiple tenants.

In one implementation, the system 340 is a multi-tenant cloud computing architecture supporting multiple services, such as one or more of the following types of services: Customer relationship management (CRM); configure, price, quote (CPQ); business process modeling (BPM); Customer support; Marketing; External data connectivity; productivity; Database-as-a-Service; Data-as-a-Service (DaaS); Platform-as-a-service (PaaS); Infrastructure-as-a-Service (IaaS) (e.g., virtual machines, servers, and/or storage); Analytics; Community; Internet-of-Things (IoT); Industry-specific; Artificial intelligence (AI); Application marketplace ("app store"); Data modeling; Security; Identity and access management (IAM); and/or Data Catalog/Canonical Data Model service(s) such as those discussed herein.

For example, system 340 may include an application platform 344 that enables PaaS for creating, managing, and executing one or more applications developed by the provider of the application platform 344, users accessing the system '340 via one or more of user devices 380A-380S, or third-party application developers accessing the system 340 via one or more of user devices 380A-380S.

In some implementations, one or more of the service(s) 342 may use one or more multi-tenant databases 346, as well as system data storage 350 for system data 352 accessible to system 340. In certain implementations, the system 340 includes a set of one or more servers that are running on server electronic devices and that are configured to handle requests for any authorized user associated with any tenant (there is no server affinity for a user and/or tenant to a specific server). The user devices 380A-380S communicate with the server(s) of system 340 to request and update tenant-level data and system-level data hosted by system 340, and in response the system 340 (e.g., one or more servers in system 340) automatically may generate one or more Structured Query Language (SQL) statements (e.g., one or more SQL queries) that are designed to access the desired information from the multi-tenant database(s) 346 and/or system data storage 350.

In some implementations, the service(s) 342 are implemented using virtual applications dynamically created at run time responsive to queries from the user devices '380A-380S and in accordance with metadata, including: 1) metadata that describes constructs (e.g., forms, reports, workflows, user access privileges, business logic) that are common to multiple tenants; and/or 2) metadata that is tenant specific and describes tenant specific constructs (e.g., tables, reports, dashboards, interfaces, etc.) and is stored in a multi-tenant database. To that end, the program code 360 may be a runtime engine that materializes application data from the metadata; that is, there is a clear separation of the compiled runtime engine (also known as the system kernel), tenant data, and the metadata, which makes it possible to independently update the system kernel and tenant-specific applications and schemas, with virtually no risk of one affecting the others. Further, in one implementation, the application platform 344 includes an application setup mechanism that supports application developers' creation and management of applications, which may be saved as metadata by save routines. Invocations to such applications, including the Data Catalog/Canonical Data Model service(s), may be coded using Procedural Language/Structured Object Query Language (PL/SOQL) that provides a programming language style interface. Invocations to applications may be detected by one or more system processes, which manages retrieving application metadata for the tenant making the invocation and executing the metadata as an application in a software container and/or a virtual machine.

In one implementation, system '340 provides service(s) 342 with a pod that includes one or more content batch servers, content search servers, query servers, file servers, access control system (ACS) servers, batch servers, application servers, quick file systems (QFS), and indexers. The application servers may execute procedures (e.g., programs, routines, scripts) for supporting the construction of applications that provide the service(s) 342. The content batch servers may handle requests internal to the pod. These requests may be long-running and/or not tied to a particular user or tenant (e.g., requests related to log mining, cleanup work, and maintenance tasks). The content search servers may provide query and indexer functions. The file servers may manage requests for information being stored, such as documents, images, and basic large objects (BLOBs). The query servers may be used to retrieve information from one or more file servers. For example, the query system may receive requests for information from the application servers and then transmit queries to the NFS located outside the pod. The ACS servers may control access to data, hardware resources, or software resources. The batch servers may process batch jobs, which are used to run tasks at specified times. Thus, the batch servers may transmit instructions to other servers, such as the application servers, to trigger the batch jobs. The QFS may serve as a rapid-access file system for storing and accessing information available within the pod. In some implementations, database information may be transmitted to the indexer which provides an index of information available in the database and/or QFS. The index information may be provided to file servers and/or the QFS. Outside the pod there may be network file systems (NFSs) and a load balancer. The NFSs may allow servers located in the pod to access information over a network like the servers access local storage. The QFS may communicate with one or more content search servers and/or indexers to identify, retrieve, move, and/or update data stored outside the pod in the NFSs and/or other storage systems. In some implementations, one or more of the query servers may communicate with the NFSs to retrieve and/or update information stored outside of the pod. In some implementations, queries from the query servers may be transmitted to the NFSs via the load balancer, which may distribute resource requests over various resources.

Network 382 may be any one or any combination of a LAN (local area network), WAN (wide area network), telephone network, wireless network, point-to-point network, star network, token ring network, hub network, or other appropriate configuration. The network may comply with one or more network protocols, including an Institute of Electrical and Electronics Engineers (IEEE) protocol, a 3rd Generation Partnership Project (3GPP) protocol, a $4^{th}$ generation wireless protocol (4G) (e.g., the Long Term Evolution (LTE) standard, LTE Advanced, LTE Advanced Pro), a fifth generation wireless protocol (5G), and/or similar wired and/or wireless protocols, and may include one or more intermediary devices for routing data between the system 340 and the user devices 380A-380S.

Each user device 380A-380S (such as a desktop personal computer, workstation, laptop, Personal Digital Assistant (PDA), smartphone, smartwatch, wearable device, augmented reality (AR) device, virtual reality (VR) device, etc.) typically includes one or more user interface devices, such as a keyboard, a mouse, a trackball, a touch pad, a touch screen, a pen or the like, video or touch free user interfaces, for interacting with a graphical user interface (GUI) provided on a display (e.g., a monitor screen, a liquid crystal display (LCD), a head-up display, a head-mounted display, etc.) in conjunction with pages, forms, applications and other information provided by system '340. For example, the user interface device can be used to access data and applications hosted by system '340, and to perform searches on stored data, and otherwise allow one or more of users 384A-384S to interact with various GUI pages that may be presented to the one or more of users 384A-384S. User devices 380A-380S might communicate with system 340 using Transfer Control Protocol and Internet Protocol (TCP/IP) and, at a higher network level, use other networking protocols to communicate, such as Hypertext Transfer Protocol (HTTP), File Transfer Protocol (FTP), Andrew File System (AFS), Wireless Application Protocol (WAP), Network File System (NFS), an application program interface (API) based upon protocols such as Simple Object Access Protocol (SOAP), Representational State Transfer (REST), etc. In an example where HTTP is used, one or more user devices 380A-380S might include an HTTP client, commonly referred to as a "browser," for sending and receiving HTTP messages to and from server(s) of system '340, thus allowing users 384A-384S of the user devices '380A-380S to access, process and view information, pages and applications available to it from system '340 over network 382.

3. Terminology

In the above description, numerous specific details such as resource partitioning/sharing/duplication implementations, types and interrelationships of system components, and logic partitioning/integration choices are set forth in order to provide a more thorough understanding. The invention may be practiced without such specific details, however. In other instances, control structures, logic implementations, opcodes, means to specify operands, and full software instruction sequences have not been shown in detail since those of ordinary skill in the art, with the included descriptions, will be able to implement what is described without undue experimentation.

References in the specification to "one implementation," "an implementation," "an example implementation," etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, and/or characteristic is described in connection with an implementation, one skilled in the art would know to affect such feature, structure, and/or characteristic in connection with other implementations whether or not explicitly described.

For example, the figure(s) illustrating flow diagrams sometimes refer to the figure(s) illustrating block diagrams, and vice versa. Whether or not explicitly described, the alternative implementations discussed with reference to the figure(s) illustrating block diagrams also apply to the implementations discussed with reference to the figure(s) illustrating flow diagrams, and vice versa. At the same time, the scope of this description includes implementations, other than those discussed with reference to the block diagrams, for performing the flow diagrams, and vice versa.

Bracketed text and blocks with dashed borders (e.g., large dashes, small dashes, dot-dash, and dots) may be used herein to illustrate optional operations and/or structures that add additional features to some implementations. However, such notation should not be taken to mean that these are the only options or optional operations, and/or that blocks with solid borders are not optional in certain implementations.

The detailed description and claims may use the term "coupled," along with its derivatives. "Coupled" is used to indicate that two or more elements, which may or may not be in direct physical or electrical contact with each other, co-operate or interact with each other.

3.1. Data Use

The term "reference" refers to data useable to locate other data and may be implemented a variety of ways (e.g., a pointer, an index, a handle, a key, an identifier, etc.).

The term "receipt" refers to receipt of data by a system may occur differently in different implementations (e.g., it may be pushed to the system (often referred to as a push model), pulled by the system (often referred to as a pull model), etc.).

The term "log analyzer" refers to a tool to analyze the logs generated by one or more entities, such as an operating system, application, network equipment, etc.

The term "user" refers to an entity (e.g., an individual person) that uses an electronic device. Software and/or services may use credentials to distinguish different accounts associated with the same and/or different users. Users can have one or more roles, such as administrator, programmer/developer, and end user roles. As an administrator, a user typically uses electronic devices to administer them for other users, and thus an administrator often works directly and/or indirectly with server devices and client devices.

3.2. Application Programming Interfaces (APIs)

The term "application programming interface" or "API" refers to interface(s) for software components to communicate with each other and/or developer tool(s) that allows for systems to talk to each other. In some implementations, the API(s) are source code specification(s) or a collection of libraries, routines, methods, data structures, fields, objects, classes, variables, remote calls, and the like that defines how a software element may access or interact with the underlying platform capabilities and features. Developers and programmers can use the API(s) by importing the relevant classes and writing statements that instantiate the classes and call their methods, fields, etc.

The API(s) may be implemented as remote API(s) or web API(s), such as a Representational State Transfer (REST or RESTful) API, Simple Object Access Protocol (SOAP) API, salesforce.com Apex API, and/or some other like API. The API may be implemented as a web service including, for example, Apache® Axi2.4 or Axi3, Apache® CXF, a JSON-Remote Procedure Call (RPC) API (e.g., Ethereum JSON-RPC API implemented by a public or enterprise Ethereum® blockchain platform), JSON-Web Service Protocol (WSP), Web Services Description Language (WSDL), XML Interface for Network Services (XINS), Web Services Conversation Language (WSCL), Web Services Flow Language (WSFL), RESTful web services, and/or the like.

3.3. Dashboards

The term "dashboard" refers to a collection of boxes (often rectangular and referred to as tiles or panels) that often fits on a single webpage or application window (also called a canvas) and that is for display to a user through a user device. Typically, a given dashboard is for display to many users through multiple user devices. Each box of a dashboard contains a content element (e.g., a chart, a graph, an image, a spreadsheet, a pivot table, a list, a table, a widget; some of which are sometimes referred to as a "view" or a "visual") which represents or is based on data from a data set. A dashboard and/or one, more, or all of the boxes may include a "menu bar" or other type of display item that allows the user to interact with the dashboard and/or the boxes. A data set is a collection of data used to create a content element. A data set may include (filtered and/or unfiltered) data from a single data source or from multiple data sources (e.g., one or more tables from an Excel workbook, one or more databases, a website, software services (e.g., Salesforce), etc.).

While in some implementations the user interface providing the dashboard is such that the available dashboards are relatively fixed, in other implementations the user interface allows users to create and edit dashboards, and share them with other users. Existing user interfaces (sometimes referred to as business intelligence (BI) tools) allow for this. The ability to create and/or edit dashboards is sometimes referred to as self-service or user-customizable dashboards. This ability enables data discovery. Data discovery is a user-driven process of collating, visualizing, exploring, and analyzing a data set, including searching for patterns or specific items in a data set. Data discovery applications often use visual tools (e.g., maps, pivot-tables) to make the process of finding patterns or specific items rapid and intuitive. Data discovery may leverage statistical and data mining techniques to accomplish these goals.

3.4. Cloud Services

The term "cloud computing" refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like).

"Cloud" services provide shared resources, software, and information to computers and other electronic devices upon request. In cloud environments, software can be accessible over the internet rather than installed locally on in-house computer systems. Cloud services typically involve on-demand, over-the-internet provision of dynamically scalable and often virtualized resources. Technological details can be abstracted from the users, who no longer need expertise in, or control over, the technology infrastructure "in the cloud" that supports them.

Multi-tenancy may be a feature of cloud computing where physical or virtual resources are allocated in such a way that multiple tenants and their computations and data are isolated from and inaccessible to one another. As used herein, the term "tenant" refers to a group of users (e.g., cloud service users) who share common access with specific privileges to a software instance and/or a set of computing resources. Tenants may be individuals, organizations, or enterprises that are customers or users of a cloud computing service or platform. However, a given cloud service customer organization could have many different tenancies with a single cloud service provider representing different groups within the organization. A multi-tenant platform or architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

3.5. Customer Relationship Management (CRM)

Customer relationship management (CRM) is a term that refers to practices, strategies, and/or technologies that companies (e.g., vendors) use to manage and analyze customer interactions and data throughout the customer lifecycle, with the goal of improving customer relationships, customer retention, and sales growth. A CRM system is designed to compile information about customers across different channels (e.g., points of contact between the customer and the company such as the company's website, telephone, live chat, direct mail, marketing materials, and social media, etc.). A CRM system can also give customer-facing staff detailed information about a particular customer's personal information, purchase history, buying preferences, and concerns.

3.6. Databases and Database Models

Databases may be implemented according to a variety of different database models, such as relational, non-relational, graph, columnar (also known as extensible record; e.g., HBase), object, tabular, tuple store, and multi-model. Examples of non-relational database models (which may also be referred to as schema-less and NoSQL database models) include key-value store and document store (also known as document-oriented as they store document-oriented information, which is also known as semi-structured data).

A database may comprise one or more database objects that are managed by a database management system (DBMS). Each database object may include a number of records, and each record may comprise a set of fields. A record may take different forms based on the database model being used and/or the specific database object to which it belongs; for example, a record may be: 1) a row in a table of a relational database; 2) a JavaScript Object Notation (JSON) object; 3) an Extensible Markup Language (XML) document; 4) a key-value pair; etc. A database object can be unstructured or have a structure defined by the DBMS (a standard database object) and/or defined by a user (a custom database object). In some implementations of a cloud database (a database that runs on a cloud platform and that is provided as a database service), identifiers are used instead of database keys, and relationships are used instead of foreign keys. While implementations may use one or more types of databases, a relational database with tables is sometimes described to simplify understanding. In a relational database management system (RDBMS), each relational database table (which is a type of database object) generally contains one or more data categories logically arranged as columns according to a schema, where the columns of the relational database table are different ones of the fields from the plurality of records, and where rows of the relational database table are different ones of a plurality of records and each contains an instance of data for each category defined by the fields. Thus, the fields of a record are defined by the structure of the database object to which the record belongs; e.g., a CRM database may include a table that describes a customer with fields for contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields.

The term "query" refers to a request for information from a database. The term "query plan" or "query execution plan" refers to one or more operations used to access information in a DBMS. The term "query optimizer" is a function or other entity of a DBMS that attempts to determine the most efficient way to execute a given query by considering one or more possible query plans.

As used herein, the term "multi-tenant DBMS" refers to a multi-tenant system that provides one or more services to tenants using one or more multi-tenant databases. For example, a given server may simultaneously process requests for many tenants, and a given database object potentially may store records for many more tenants.

The term "data as a service" or "DaaS" refers to an information provision and distribution model in which data files (including text, images, audio, and video content) are made available to customers over a network. A DaaS system may be a multi-tenant system. A multi-tenant DaaS system may include a single software instance of each of the various services (e.g., the Data Catalog/Canonical Data Model service(s) discussed herein) that may be accessed by multiple tenants, where each tenant is provided with a dedicated share of a software instance of each of the services. In addition, metadata may be used for configuring one or more of the shares of the software instances (e.g., configuring a share specifically for each tenant based on that tenant's specific configuration information).

In the context of a DaaS system, a tenant may provide a tenant dataset for ingestion into the DaaS system using tenant-specific configuration information. In this example, ingestion is performed on the tenant dataset by an ingestion service that is configured according to the tenant-specific configuration information. For ingestion, the tenant-specific configuration information may include information describing the structure of the tenant dataset. The information may be used by the DaaS to validate the tenant dataset and to support retrieving records from the tenant dataset for search and match services (e.g., locating records in the tenant dataset based on search and match queries to import new and/or updated records).

The DaaS system may also optionally analyze the tenant dataset to produce an analyzed dataset using tenant-specific configuration information that configures an analysis service. This analysis may include analysis operations performed on the tenant dataset after ingestion and indicated in the tenant-specific configuration information (in other words, the tenant-specific configuration information may also include indications of which analysis operations to perform). A search service may use the analyzed dataset for allowing customers to perform search queries to import records from the tenant dataset.

The DaaS system may optionally index the tenant dataset to produce an indexed dataset using tenant-specific configuration information that configures an indexing service. The indexing may be performed based on match keys specified in the tenant-specific configuration information. A match service may use the indexed dataset to perform match queries to match records already imported with potentially updated versions in the tenant dataset. The match service may be configured to support match queries using the tenant-specific configuration information, which includes indications of the match keys to generate for a corresponding match query, match rules to perform the match query, and indications of weights to apply to rank the match query results.

3.7. Platforms for Business-As-A-Service

A Platform for Business-as-a-Service (e.g., MuleSoft®) brings together data about a customer from a variety of sources, building a single view of that customer, and then turning that insight into a customized experience. One such integration product (e.g., Integration Cloud) includes: 1) a platform (e.g., Integration Platform) for building application networks (which connect applications or systems using APIs to securely share data, regardless of format or source); 2) a builder (e.g., Integration Builder) to bring together a complete picture of an item of data (e.g., customer) from a cloud service (e.g., Salesforce tools), as well as across other enterprise data repositories; and 3) a marketing service (e.g., Integration Experiences) that allows brands to build customized marketing experiences based on all the information learned from the other tools.

3.8. Micro-Services and Micro-Services Architecture

The term "micro-services architecture" refers to an architecture comprised of micro-services in which each of the micro-services does just one thing efficiently and interacts with others of the micro-services as needed. This contrasts with monolithic architectures in which complex software is run on a single, powerful server. Each of the micro-services may use a different type of hardware (e.g., machine configurations that include specific numbers of processors, types of processors (e.g., CPUs, GPUs, accelerators), types of memories (e.g., DDR DRAM, HBM, etc.), and/or I/O characteristics) and/or software to respectively perform a type of processing different from the types of processing performed by the other micro-services. The micro-services architecture allows an application to be decomposed into different ones of these micro-services, improving modularity and making the program code easier to understand, design and test. For example, individual micro-services may be modified (e.g., upgraded, swapped out) without affecting the operation of other micro-services used by the application (i.e., typically, each micro-service is independently deployable). Thus, a "micro-services architecture" may be a loosely coupled arrangement of such micro-services over a network, where each micro-service performs its particular type of processing within the context of a larger, overarching operation (the application), and communicates with other micro-services over the network.

3.9. Big Data

The term "big data" is an evolving term that describes a large volume of structured, semi-structured and/or unstructured data that has useful potential (e.g., to be mined for information and used in machine learning projects and other advanced analytics applications).

The term "data lake" refers to a storage repository holding a large amount of data that remains in a native format until the data is needed. A data lake typically uses a flat architecture to store data. For example, a data lake may be a single store of all enterprise data including source system data and transformed data used for tasks such as reporting, visualization, analytics and machine learning. By way of a specific example, a data lake may store tokenized log records for a predetermined period of time. Downstream consumer(s) can query the data lake for a smaller set of relevant data, and then analyze it. Exemplary technologies for hosting data lakes include Apache Hadoop's distributed file system, Microsoft's Azure Data Lake or Amazon S3's cloud storage services, and virtual data lake solutions such as Alluxio.

The term "data warehouse" refers to a system used for reporting and data analysis, which comprises one or more central repositories of integrated data from one or more disparate sources. Data warehouses store current and historical data in a central location, where the stored data may be used for creating analytical reports. Data warehouses may be populated with data using Extract, Transform, Load (ETL) or Extract, Load, Transform (ELT) approaches.

The term "big data processing" refers to the processing of big data. Big data processing can be provided using various tools, including Apache Hadoop; Apache Spark; Yet Another Resource Negotiator (YARN), which is Hadoop's built-in resource manager and job scheduler); the MapReduce programming framework; Apache Kafka, an application-to-application messaging and data streaming platform; the Apache HBase database; and SQL-on-Hadoop query engines like Drill, Hive, Impala and Presto. Big data processing may also implicate managed services that include highly-distributed Apache Hadoop compute instances, the Apache Spark processing engine and related big data technologies. Amazon Elastic MapReduce (EMR) from Amazon Web Services (AWS) is one example of a big data service that runs in a public cloud; other examples include Microsoft's Azure HDInsight and Google Cloud Dataproc. In cloud environments, big data can be stored in the Hadoop Distributed File System (HDFS) or in lower-cost cloud object storage, such as Amazon Simple Storage Service (S3); NoSQL databases are another option in the cloud for applications.

3.10. Other Electronic Devices

The term "Internet of Things" or "IoT" refers to a system of interrelated computing devices, mechanical and digital machines capable of transferring data with little or no human interaction. The Internet of Things (IoT) is characterized by a large number and variety of electronic devices communicating via wireless and/or wired connections to interact with each other and cooperate to create applications and services (e.g., in smart devices, cars, homes, cities, smart industries, and traditional industries including energy, agriculture, and tourism). IoT may involve technologies such as real-time analytics, machine learning and/or artificial intelligence (AI), embedded systems, wireless sensor networks, control systems, automation (e.g., smarthome, smart building and/or smart city technologies), and the like. IoT devices are usually low-power devices without heavy compute or storage capabilities.

The term "network device" refers to an electronic device that communicatively interconnects other electronic devices on the network (e.g., other network devices, user devices, etc.). Network devices may include multiple services network devices that provide support for multiple networking functions (e.g., routing, bridging, switching, Layer 2 aggregation, session border control, Quality of Service, and/or subscriber management), and/or provide support for multiple application services (e.g., data, voice, and video).

3.11. Events

The term "event" refers to any identifiable unit of data that conveys information about an occurrence or entity. An event may have three aspects: a timestamp indicating when the event occurred, a set of dimensions indicating various attributes about the event, and a set of metrics related to the event. Events can be user-generated or system-generated. An event typically represents some message, token, count, pattern, value, or marker that can be recognized within a data stream. Examples of events include server log entries, clicks on hyperlinks, end user logins from client devices, content posted to a feed (e.g., on a social network service), social graph data, metadata including whether comments are posted in reply to a prior posting, news articles, etc. Events can be in a semi-structured data format like JSON, Binary JSON (BSON), XML, Protobuf, Avro, and/or Thrift objects.

3.12. Containers and Container Orchestration Systems (COSs)

A container-orchestration system (COS) automates deployment, scaling and management of containerized applications (also referred to as containerized software and containerized apps); in other words, it provides a platform for automating deployment, scaling, and operations of application containers across clusters of hosts. For example, Kubernetes is a COS that works with a range of container tools, including those provided by Docker, Inc. Another example of a COS is Docker Swarm. A container is a self-contained execution environment, such as a Linux execution environment; in other words, a container is a standard unit of software that packages up code and all its dependencies, so that the application runs quickly and reliably regardless of its computing environment. A container image is used to create one or more containers at runtime. A container image is a lightweight, standalone, executable package of software that includes everything needed to run an application: code, runtime, system tools, system libraries and settings (e.g., a Docker container image becomes a Docker container when it is run on Docker Engine; another container engine is Rkt).

With regard to hardware, a COS may include: 1) nodes (also referred to herein as COS nodes), where a node is a representation of a single machine in a COS cluster, where that single machine can be a physical machine in a datacenter or virtual machine hosted on a cloud provider; 2) clusters (also referred to herein as COS clusters), where a cluster represents a more powerful machine resulting from pooling the resources (processors and memory) of the nodes within the cluster; and 3) persistent volumes (a persistent volume is a file system that can be mounted to the cluster, without being associated with any particular node; while traditional local storage associated to each node is treated as a temporary cache to hold programs and data).

With regard to software, a COS may include: 1) containers (also referred to as COS containers, Docker containers, etc.); 2) pods (also referred to herein as "replicas," "COS pods," or "kpods" in a Kubernetes implementation), where a pod is the unit of replication and wraps one or more containers that will share the same resources and local network; 3) deployments, where a deployment manages a pod, including declaring the number of replicas of the pod and monitoring the pods; and 4) ingress, where an ingress refers to a communication channel between a service running in a pod and the outside world, and is typically either an ingress controller, a load balancer, or Kube-proxy (a combination of a network proxy and a load balancer). In addition, a COS has support for an abstraction (e.g., a Kubernetes Service) that defines a logical set of pods and a policy by which to access them (sometimes called a microservice), as well as an API (e.g., Kubernetes Endpoints API) so that the service provided by one such abstraction can call the service provided by another such abstraction.

In operation, a COS cluster of nodes is formed and a set of one or more persistent volumes is attached to that cluster. Then, a COS deployment is launched onto the cluster. The COS deployment causes the spinning up and monitoring of the declared number of COS pods. Spinning up a COS pod includes executing the containerized application(s) specified in the container image(s) identified for that COS pod.

A COS typically includes a COS controller to control operation of the COS. A COS controller can receive an operation according to configuration information (sometimes referred to as a manifest, an "API object description," or "application configuration information") that describes the desired state of an application in terms of COS constructs.

3.13. Data Privacy (e.g., GDPR)

Sensitive data is information that requires protection against unwarranted disclosure. Protection of sensitive data may be required for legal or ethical reasons, for issues pertaining to personal privacy, and/or for proprietary considerations. Broadly speaking, the term "personal data" is any information relating to an identified or identifiable person. Personal data can include a person's name, a person's contact information (e.g., a mailing address, email address, and/or telephone number), a person's user identifier (referred herein as UserID) assigned by an application/ service, an IP address associated with a device used by the person to access the application/service, or any other information that is related to the person which can be obtained or used by an application/service. In some implementations, a distinction can be made between personal data, which uniquely identifies a user (e.g., a person's name) or renders the user identifiable (e.g., a user identifier), and user traceable data. User traceable data is data that is not directly personal data (i.e., does not directly identify the user or make the user identifiable) but can be traced back to the identity or an activity of the user (e.g., an IP address of a device used by the user, a user's mailing address if the user is not the only person living at that address, etc.).

Computing environments may manage data related to multiple entities (e.g., people, groups, companies, positions, archives) and need to provide privacy and data governance functionality. Such computing environments may store for each entity multiple database objects and/or records, each of which can have associated privacy and data governance characteristics and parameters. For example, in a small office setting, an employee may have: 1) an employee profile managed by the human resources department; and 2) an individual contact entry in a shared contacts database/app/ tool. Each of these objects and/or records may have different associated permissions, uses, privacy requirements, access rights, etc.

Data classifications may be associated with fields of database objects and used to determine data permissions, data uses, privacy requirements, access rights, data governance, etc. For example, data classifications may include one or more of: 1) Public (e.g., data meant to be viewed, but not altered, by the public); 2) Internal (e.g., data meant to be viewed/used by all at an organization that owns the data and/or contractors thereof, and potentially shared with customers, partners, and others under a non-disclosure agreement (NDA)); 3) Confidential (e.g., data meant to be used by a defined subset of the organization that owns the data and/or contractors thereof, and potentially shared with customers, partners, and others under a non-disclosure agreement (NDA) on an as-needed basis, but is not protected by law or regulation); 4) Restricted (e.g., data meant to be used by a smaller, defined subset of the organization and/or its contractors and is likely protected by law, regulation, and/or NDA); and/or 5) Mission Critical (e.g., data meant to be used by an even smaller, defined subset of employees/ owners, as well as previously approved contractors or third parties subject to heightened contractual requirements, and is almost always protected by law, regulation, and/or NDA).

While the above description includes several example implementations, the invention is not limited to the implementations described and can be practiced with modification and alteration within the spirit and scope of the appended claims. The description is thus illustrative instead of limiting.

What is claimed is:

1. A non-transitory machine-readable storage medium (NTCRSM) comprising instructions, wherein execution of the instructions by a processor is to cause the processor to:
receive a query for data sources related to a first application (app), wherein the first app has a first logical data model in a first metadata repository;
identify, in the first logical data model, first mappings of first elements of the first app to corresponding canonical elements of a canonical data model (CDM);
identify applications and services (apps/services) in a same group as the first app based on a query of a global directory of enterprises of a cloud computing service or a global directory of tenants in multi-tenant system;
obtain a selection of an object defined by the first logical data model;
identify a canonical entity unique identifier (ID) for the selected object;
submit a distributed query against respective metadata repositories of the identified apps/services having one or more data sources mapped to the selected object in the respective metadata repositories;
obtain individual responses to the distributed query from respective ones of the identified apps/services, wherein the individual responses indicate the one or more data sources mapped to the selected object;
obtain data source information from the one or more data sources indicated by the individual responses;
identify data sources of the one or more data sources not already mapped to the first elements based on the data source information;
identify data sources of the one or more data sources common to the first app and a second app based on the data source information, wherein the second app is associated with a second logical data model;
determine one or more source objects mapped to the selected object in the identified apps/services;
generate a list of data items of the selected object that have been mapped to one or more canonical elements;
determine, in the second logical data model, second mappings of second elements of the second logical data model to the identified canonical elements; and
provide, in response to the query, a set of mappings of the first elements to the determined second elements as the data sources related to the first app.

2. The NTCRSM of claim 1, wherein the first and second apps are communicatively coupled with one or more data sources via respective connectors.

3. The NTCRSM of claim 1, wherein the first app includes the first metadata repository configurable to store the first logical data model, and the second app includes a second metadata repository configurable to store the second logical data model.

4. The NTCRSM of claim 3, wherein the first metadata repository is further configurable to store a first version of the CDM, and the second metadata repository is further configurable to store a second version of the CDM.

5. The NTCRSM of claim 4, wherein the first version of the CDM includes the first mappings of the canonical elements to the first elements, and the second version of the CDM includes the second mappings of the canonical elements to the second elements.

6. The NTCRSM of claim 5, wherein execution of the instructions is to cause the processor to:
generate the set of mappings of the first elements to the determined second elements based on the first mappings and the second mappings.

7. The NTCRSM of claim 1, wherein the first app is associated with an enterprise, and execution of the instructions is to cause the processor to:
identify a set of apps also associated with the enterprise, the set of apps at least including the second app.

8. The NTCRSM of claim 7, wherein execution of the instructions is to cause the processor to:

identify respective unique IDs for the canonical elements corresponding to the first elements;
query metadata repositories of each app of the set of apps based on the respective unique IDs; and
obtain a response to the query indicating individual apps of the set of apps having mappings to the canonical elements.

9. The NTCRSM of claim 8, wherein execution of the instructions is to cause the processor to:
retrieve data source information from respective data sources associated with the individual apps;
determine existing data sources common to the first and second apps; and
determine new data sources not common to the first and second apps.

10. The NTCRSM of claim 9, wherein execution of the instructions is to cause the processor to:
update the first logical data model to include the new data sources.

11. The NTCRSM of claim 1, wherein execution of the instructions is to cause the processor to:
compare data elements of the source object that are mapped to data elements of objects in the identified apps/services with data elements of the selected object;
indicate any of the data elements of the source object with mappings in the identified apps/services that are not also mapped to the data elements of the selected object; and
update the first logical data model to include the indicated data elements.

12. The NTCRSM of claim 11, wherein execution of the instructions is to cause the processor to:
compare authentication and authorization settings of one or more data sources associated with the second app with credentials associated with the first app; and
set up the one or more data sources using the credentials based on the comparison.

13. A method for providing data catalog services, the method comprising:
obtaining a query for data sources related to a first application (app), the first app having a first logical data model in a first metadata repository;
identifying, in the first logical data model, first mappings of first elements of the first app to corresponding canonical elements of a canonical data model (CDM);
identifying apps and services (apps/services) in a same group as the first app;
obtaining a selection of an object defined by the first logical data model;
identifying a canonical entity unique identifier (ID) for the selected object;
submitting a distributed query against respective metadata repositories of the identified apps/services having one or more data sources mapped to the selected object in the respective metadata repositories;
obtaining individual responses to the distributed query from respective ones of the identified apps/services, wherein the individual responses indicate the one or more data sources mapped to the selected object;
obtaining data source information from the one or more data sources indicated by the individual responses; and
identifying data sources of the one or more data sources not already mapped to the first elements based on the data source information;
identifying data sources of the one or more data sources common to the first app and a second app based on the data source information, wherein the second app has a second logical data model;
determining one or more source objects mapped to the selected object in the identified apps/services;
generating a list of data items of the selected object that have been mapped to one or more canonical elements;
determining, in the second logical data model, second mappings of second elements of the second logical data model to the identified canonical elements; and
providing, in response to the query, a set of mappings of the first elements to the determined second elements as the data sources related to the first app.

14. The method of claim 13, wherein identifying the apps/services in the same group as the first app comprises:
querying a global directory of enterprises of a cloud computing service or a global directory of tenants in multi-tenant system.

15. The method of claim 13, further comprising:
comparing data elements of the source object that are mapped to data elements of objects in the identified apps/services with data elements of the selected object; and
indicating any of the data elements of the source object with mappings in the identified apps/services that are not also mapped to the data elements of the selected object.

16. The method of claim 15, further comprising:
updating the first logical data model to include the indicated data elements.

17. The method of claim 16, further comprising:
comparing authentication and authorization settings of one or more data sources associated with the second app with credentials associated with the first app; and
setting up the one or more data sources using the credentials based on the comparing.

18. An apparatus comprising:
at least one processor; and
a non-transitory machine-readable storage medium that comprises instructions, wherein execution of the instructions is to cause the apparatus to:
obtain a query for data sources related to a first application (app), wherein the first app has a first logical data model in a first metadata repository;
identify, in the first logical data model, first mappings of first elements of the first app to corresponding canonical elements of a canonical data model (CDM);
identify applications and services (apps/services) in a same group as the first app;
query a global directory of enterprises of a cloud computing service or a global directory of tenants in multi-tenant system;
obtain a selection of an object defined by the first logical data model;
identify a canonical entity unique identifier (ID) for the selected object;
submit a distributed query against respective metadata repositories of the identified apps/services having one or more data sources mapped to the selected object in the respective metadata repositories;
obtain individual responses to the distributed query from respective ones of the identified apps/services, wherein the individual responses indicate the one or more data sources mapped to the selected object;

obtain data source information from the one or more data sources indicated by the individual responses;

identify data sources of the one or more data sources not already mapped to the first elements based on the data source information;

identify data sources of the one or more data sources common to the first app and a second app based on the data source information, wherein the second app is associated with a second logical data model;

determine one or more source objects mapped to the selected object in the identified apps/services;

generate a list of data items of the selected object that have been mapped to one or more canonical elements;

determine, in the second logical data model, second mappings of second elements of the second logical data model to the identified canonical elements; and provide, in response to the query, a set of mappings of the first elements to the determined second elements as the data sources related to the first app.

19. The apparatus of claim 18, wherein execution of the instructions is to cause the apparatus to:

compare data elements of the source object that are mapped to data elements of objects in the identified apps/services with data elements of the selected object;

indicate any of the data elements of the source object with mappings in the identified apps/services that are not also mapped to the data elements of the selected object;

update the first logical data model to include the indicated data elements;

compare authentication and authorization settings of one or more data sources associated with the second app with credentials associated with the first app; and set up the one or more data sources using the credentials based on the comparison.

20. The apparatus of claim 18, wherein the first and second apps are communicatively coupled with one or more data sources via respective connectors.

21. The apparatus of claim 18, wherein the first app includes the first metadata repository storing the first logical data model, and the second app includes a second metadata repository storing the second logical data model, and wherein the first metadata repository stores a first version of the CDM, and the second metadata repository stores a second version of the CDM.

22. The apparatus of claim 21, wherein the first version of the CDM includes the first mappings of the canonical elements to the first elements, and the second version of the CDM includes the second mappings of the canonical elements to the second elements, and wherein execution of the instructions is to cause the apparatus to:

generate the set of mappings of the first elements to the determined second elements based on the first mappings and the second mappings.

23. The apparatus of claim 18, wherein the first app is associated with an enterprise, and execution of the instructions is to cause the apparatus to:

identify a set of apps/services also associated with the enterprise, wherein the set of apps/services at least includes the second app.

24. The apparatus of claim 23, wherein execution of the instructions is to cause the apparatus to:

identify respective unique IDs for the canonical elements corresponding to the first elements;

query metadata repositories of each app of the set of apps based on the respective unique IDs; and obtain a response to the query of the metadata repositories indicating individual apps/services of the set of apps/services having mappings to the canonical elements.

25. The apparatus of claim 24, wherein execution of the instructions is to cause the apparatus to:

retrieve data source information from respective data sources associated with the individual apps/services;

determine existing data sources common to the first and second apps;

determine new data sources not common to the first and second apps; and update the first logical data model to include the new data sources.

* * * * *